United States Patent
Vogel

(10) Patent No.: US 10,133,822 B2
(45) Date of Patent: *Nov. 20, 2018

(54) SEMIOTIC SQUARE SEARCH AND/OR SENTIMENT ANALYSIS SYSTEM AND METHOD

(71) Applicant: TripleDip LLC, San Francisco, CA (US)

(72) Inventor: Claude Vogel, Key West, FL (US)

(73) Assignee: RAFTR, INC., San Francisco, CA (US)

( * ) Notice: Subject to any disclaimer, the term of this patent is extended or adjusted under 35 U.S.C. 154(b) by 192 days.

This patent is subject to a terminal disclaimer.

(21) Appl. No.: 15/043,299

(22) Filed: Feb. 12, 2016

(65) Prior Publication Data

US 2016/0239570 A1    Aug. 18, 2016

Related U.S. Application Data

(63) Continuation of application No. 13/321,533, filed as application No. PCT/US2010/035326 on May 18, 2010, now Pat. No. 9,286,389.

(60) Provisional application No. 61/179,829, filed on May 20, 2009.

(51) Int. Cl.
*G06F 17/30* (2006.01)
*G06F 17/27* (2006.01)

(52) U.S. Cl.
CPC ...... *G06F 17/30864* (2013.01); *G06F 17/271* (2013.01); *G06F 17/277* (2013.01); *G06F 17/3087* (2013.01); *G06F 17/30699* (2013.01); *G06F 17/30705* (2013.01); *G06F 17/3061* (2013.01)

(58) Field of Classification Search
CPC ......... G06F 17/30864; G06F 17/30321; G06F 17/30613; G06F 17/30675; G06F 17/30684; G06F 17/30696; G06F 17/30486; G06F 17/30598; G06F 17/2785; G06F 17/30; G06F 17/30616; G06F 17/30663; G06F 17/30873
USPC ............ 707/706, 705, 711, 708, 722, 731, 1
See application file for complete search history.

(56) References Cited

U.S. PATENT DOCUMENTS

| | | | |
|---|---|---|---|
| 5,963,965 A | 10/1999 | Vogel | |
| 7,912,701 B1 * | 3/2011 | Gray | G06F 17/27 704/257 |
| 8,166,032 B2 | 4/2012 | Sommer et al. | |
| 8,280,827 B2 | 10/2012 | Muller et al. | |
| 8,280,885 B2 | 10/2012 | Cardie et al. | |
| 2004/0148155 A1 | 7/2004 | Vogel | |
| 2004/0220893 A1 | 11/2004 | Spivack et al. | |
| 2005/0086218 A1 | 4/2005 | Auspitz et al. | |

(Continued)

OTHER PUBLICATIONS

C. Columbo, A. Del Bimbo, P. Pala,—"Retrieval of Commercials by Semantic Content: The Semiotic Perspective", Multimedia Tools and Applications, 13, pp. 93-118, 2001. (Year: 2001).*

(Continued)

*Primary Examiner* — Dangelino N Gortayo
(74) *Attorney, Agent, or Firm* — DLA Piper LLP (US)

(57) ABSTRACT

A semiotic square search and/or sentiment analysis system and method are provided. In one implementation, a software implemented document search system and method are disclosed. The system and method may be used to analyze sentiments in various types of data including documents, blogs, text strings and posts.

9 Claims, 29 Drawing Sheets

(56) References Cited

U.S. PATENT DOCUMENTS

| | | | |
|---|---|---|---|
| 2007/0100601 A1* | 5/2007 | Kimura | G06F 17/2755 704/4 |
| 2009/0119157 A1 | 5/2009 | Dulepet | |
| 2009/0132441 A1* | 5/2009 | Muller | H04N 7/163 706/11 |
| 2009/0276426 A1 | 11/2009 | Liachenko et al. | |
| 2009/0282019 A1 | 11/2009 | Galitsky et al. | |
| 2012/0265745 A1 | 10/2012 | Vogel | |
| 2014/0108006 A1 | 4/2014 | Vogel et al. | |

OTHER PUBLICATIONS

Anderson, et al., *Logic, Meaning and Computation*, Dec. 2001—Essays in Memory of Alonzo Church, Second Order Logic, pp. 61-75 (16 pgs.).

Wiederhold, *Binding in Information Processing*, May 1981, Report No. STAN-CS-81-851 (43 pgs.).

Wikipedia, Unification (Computer Science), retrieved Jun. 22, 2015 https://en.wikipedia.org/wiki/Unification_(computer_science) (17 pgs.).

Wikipedia, Optimal Matching, retrieved Feb. 25, 2015: https://en.wikipedia.org/wiki/Optimal_matching (3 pgs.).

PCT Patent Application No. US2010/035326, International Search Report and Written Opinion dated Jul. 20, 2010 (8 pgs.).

Colombo, et al., "Semantics in Visual Information Retrieval," IEEE, pp. 38-53, 1999 (16 pgs.).

Colombo, et al., "Retrieval of Commercials by Semantic Content: The Semiotic Perspective," Multimedia Tools and Applications, 13, pp. 93-118, 2001 (26 pgs.).

Gudwin, et al., "Computational Semiotics: An Approach for the Study of Intelligent Systems—Part 1: Foundations," Technical Report RT-DCA 09—DCA-FEEC-UNICAMP, 1997 (24 pgs.).

* cited by examiner

```
line          = [tabs] [prefixes] ["::"] expression
tabs          = tab*
tab           = ASCII 9
prefixes      = [relation-prefix] [":"] [lang-prefix]
relation-prefix = "SYN" | "ENT"
lang-prefix   = language-code | "un"
``` version=3.0 encoding=UTF-8
nfl teams and current roster
    SYN:ja::nfl のチームと選手
    SYN::national football league teams
    SYN::nfl teams
    SYN::nfl players
    SYN::nfl teams and roster
    american football conference
        SYN:ja:: アメリカン・フットボール・コンファレンス
        SYN:ja:: アメリカン・フットボール・コンファレンス
        SYN::afc
        SYN::american football conference
        ENT:un::buffalo bills
            SYN::bills
            buffalo bills coach
                ENT:UN::dick jauron
            buffalo bills quarterbacks
                ENT:UN::trent edwards
Japanese manzai and comic duo
    SYN:ja:: 漫才とお笑いコンビ
    ENT:ja:: 青山マキ・マコ
    ENT:ja:: 青文

FIGURE 18 prefixes = [semiotic-prefix] [":"] [intensity-prefix] [":"] [relation-prefix] [":"] [lang-prefix]
semiotic-prefix = "SPA" | "SPNA" | "SPB" | "SPNB"

FIGURE 19 intensity-prefix = "SIH" | "SIM"

FIGURE 20

Attitude
        SYN:fr::Attitude
        SYN:fr::Affirmation
\#    Need to Be
    SPA:SIH::Arrogant
    SPA:SIM::Assert
\#    No Need to Be
    SPNA:SIM::Desist
    SPNA:SIH::Dull
\#    Need to Not Be
    SPB:SIH::Denial
    SPB:SIM::Restrained
\#    No Need To Not Be
    SPNB:SIM::Cope
    SPNB:SIH::Parade

FIGURE 21

Attitude
        SPNB:SIH::Parade
          SYN::Over The Top

FIGURE 22

---------Sentence #1---------
does the dior homme dermo system cosmetic line of care reflect the image of the modern man?
Phrase =
<
    nil,
    nil,
    <    VPAUX,
        <<does,[VDB, VDI, VDZ]>,<Mid,Z,N>>.
        nil,
        nil,
        nil,
        nil
>,
<    NPO,
    <<the,[AT0]>,<Mid,Z,N>>.
    nil,
    <<cosmetic,[AJ0,NN1]>,<Mid,Z,N>>.
    nil,
    <<dior homme dermo system,[NN1]>,<Mid,Z,N>>.
    <<line,[NN1,VVB,VVI]>,<Mid,Z,N>>.
    nil,
    Phrase =
    <
    <<of,[PRF]>,<Mid,Z,N>>.
    nil,
    <NPS,
    nil,
    nil,
    <<care,[NN1]>,<A,H,Pos>>.
    nil,
    nil
>,                      FIGURE 23A

```
        <   VP,
    nil,
    nil,
    <<reflect,[VVB,VVI]>,<Mid,Z,N>>.
    nil,
    nil
>,
<   NPO,
    <<the,[AT0]>,<Mid,Z,N>>.
    nil,
    nil,
    <<image,[NN1,VVB,VVI]>,<MID,Z,N>>.
    nil,
    Phrase =
    <
        <<of,[PRF]>,<Mid,Z,N>>.
        nil,
        <   NPS,
            <<the,[AT0]>,<Mid,Z,N>>.
            nil,
            <<modern,[AJ0,NN1]>,<Mid,Z,N>>.
            nil,
            <<man,[NN1,VVB,VVI]>,<Mid,Z,N>>.
            nil,
            nil
            >,
            nil,
            nil
        >
        >
    >
    >
>
```

FIGURE 23B

| | | |
|---|---|---|
| Style | | |
| | Sexy | sexy |
| | Romantic | romantic |
| | Gothic | past |
| | Avant-Garde | modern |
| | Metrosexual | metrosexual |
| | Neoclassical | classical stuff |
| Sexuality | | |
| | Sex drive | virile male |
| | Womanizer | macho womanizer side |
| | Androgynous | effeminate |
| Desire | | |
| | Indulgence | esthetic |
| | Temptation | wants |
| Compassion | | |
| | Beneficial | care |
| Resistance | | |
| | Vulnerability | vulnerable |
| Dior Dermo System | | |
| | Micro-Purifying Cleansing Gel | micro-purifying cleansing gel |
| Skin Disorders | | |
| | Eczema | eczema |
| Shaving Products | | |
| | AfterShave | aftershave |
| Cosmetics Brands | | |
| | Christian Dior | dior |

FIGURE 24

| Facet | Value | Precursor | Very Positive | Positive | Negative | Very Negative | Position |
|---|---|---|---|---|---|---|---|
| Accuracy | Credit | reference | reference | | | | NonB |
| Style | Pop | modern men | virile | | | | A |
| Style | Neoclassical | classic stuff | classic | | | | NonB |
| Genericity | Concrete | real men | real | | | | A |
| Style | Avant-Garde | modern men | virile | | | | A |
| Accuracy | Credit | reference | reference | | | | NonB |
| Properties | Late | modern men | virile | | | | A |
| Direction, time | Latest | modern men | virile | | | | A |
| Integrity | Untied | free | | | | free | B |

SEMIOTIC SQUARE SEARCH AND/OR SENTIMENT ANALYSIS SYSTEM AND METHOD

PRIORITY CLAIM/RELATED APPLICATIONS

This patent application is a continuation of and claims priority under 35 USC 120 to U.S. patent application Ser. No. 13/321,533 filed on Mar. 20, 2012 and entitled "Semiotic Square Search and/or Sentiment Analysis System And Method," which is a 371 U.S. national stage filing of (and claims the benefit and priority to under 35 U.S.C. 119, 120) PCT/US10/35326 filed May 18, 2010 and entitled "Semiotic Square Search and/or Sentiment Analysis System And Method," that in turn claims priority under 35 USC 119(e) and 35 USC 120 to U.S. Provisional Patent Application Ser. No. 61/179,829 filed on May 20, 2009 and entitled "Semiotic Square Search and/or Sentiment Analysis System and Method", the entirety of which is incorporated herein by reference.

FIELD

The disclosure relates to a search system and method and in particular to a sentiment analysis system and method that utilizes a semiotic square.

BACKGROUND

The "semiotic square" was initially put forward for analyzing the narrative functions is based on works carried out at the beginning of the century by the Russian formalist Vladimir Prop. See for example, Propp, V. (1968). *Morphology of the Folktale*. Austin, University of Texas Press. Propp drew up an inventory of the functions of the Russian tale and found an astonishing stability in their functional sequences. From one tale to another, the sequence of actions may be generalized (as shown in the list below) and brought back to a series of optional functions, independent of their specific circumstances:

Initial situation (absence, prohibition, etc.)
Villainy
The hero is approached with a request or command, etc.
Departure
Test and reception of magical object
The hero and the villain join in direct combat, etc.
Liquidation of initial misfortune or lack
The hero returns, is pursued, etc.
Punishment
Marriage, etc.

Applying a structuralist approach to these formal results (Propp simply looked for and found remarkable forms), Greimas transforms this linear sequence into a system of oppositions in Greimas, A. J. (1966), *Sémantique structurale*. Paris, Larousse. In the book:

He couples reciprocal functions: prohibition vs. violation, command vs. acceptance.
He generalizes these pairs: (mandate vs. acceptance) =establishment of the contract, (prohibition vs. violation)=breaching of the contract, etc.
He obtains a square figure: (mandate vs. acceptance) vs. (prohibition vs. violation), in which the terms prohibition and violation are respectively the negative (privative) forms of command and acceptance.

An example of a semiotic square is shown in FIG. 1. This squared figure is doubly emblematic as it forms the heart of the functional outline, the "contract" and it is based on a squared figure that combines three canonical semiotic relations:

Opposition (mandate vs. acceptance);
Absence (mandate vs. prohibition); and,
Gradation (mandate vs. violation).

"Modern logic designates the first ('contrary') relationship equipollent . . . ; it designates the second ('contradictory') relationship privative . . . : that is, the opposition formed by the presence or absence of some quality . . . A third logical opposition—the three together exhausting the logical possibilities of opposition—it designates arbitrary (or gradual) . . . : that is, the opposition formed by cultural (and hence 'arbitrary') categories . . . The elements of this last opposition often appear on a continuum . . . : hence the designation gradual" as described in Schleifer, R. (1983). Introduction. *Structural semantics*. Lincoln, University of Nebraska Press: xii-lvi, pg. xxxiii. Greimas can therefore resume the dynamics of the narrative functions in a functional outline built around a double inversion as shown in FIG. 2.

It is desirable to utilize the semiotic square to perform sentiment analysis and searches which is not performed by current systems and method. Thus, it is desirable to provide a semiotic square sentiment analysis system and method and it is to this end that the disclosure is directed.

BRIEF DESCRIPTION OF THE DRAWINGS

FIG. 18 illustrates an example of the thesaurus for a particular semiotic square;

FIG. 19 illustrates an example of the syntax for semiotic markers that can be used in the thesaurus implementation of the semiotic squares library;

FIG. 20 illustrates an example of the syntax for intensity marker that can be used in the thesaurus implementation of the semiotic squares library;

FIG. 21 illustrates an example of the semiotic markers and intensity markers for a semiotic square;

FIG. 22 illustrates an example of the syntax for idiomatic phrases that can be used in the indexing implementation of the semiotic squares library;

FIG. 23A-23B illustrates an example of the syntactic analysis performed using the indexing implementation of the semiotic squares library;

FIG. 24 illustrates an example of the categorization that is part of the indexing implementation of the semiotic squares library;

FIG. 25 illustrates a sentiment grid of the indexing implementation of the semiotic squares library;

FIGS. 26 and 27 illustrate an example of a search using the semiotic system;

DETAILED DESCRIPTION OF ONE OR MORE EMBODIMENTS

The disclosure is particularly applicable to a software implemented document search system and method and it is in this context that the disclosure will be described. It will be appreciated, however, that the system and method has greater utility since the system and method can be implemented using hardware or a combination of hardware and software and the system and method may be used to analyze sentiments in various types of data including documents, blogs, text strings, posts, etc . . . and the system and method are not limited to the particular implementation described below.

Figure 1:
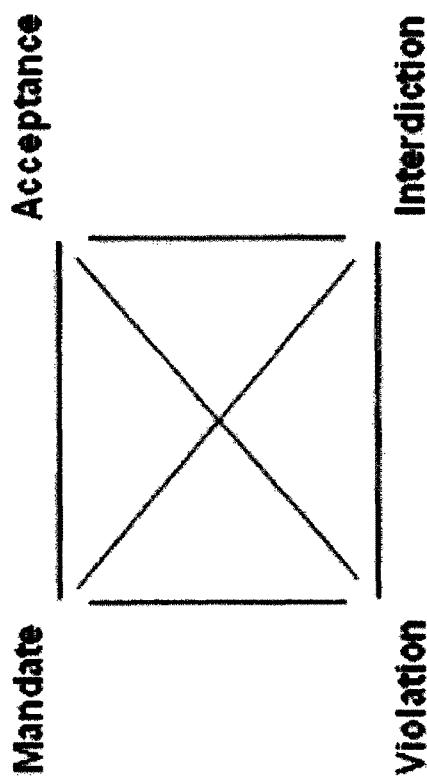
FIG. 1 illustrates a semiotic square.
Figure 2:
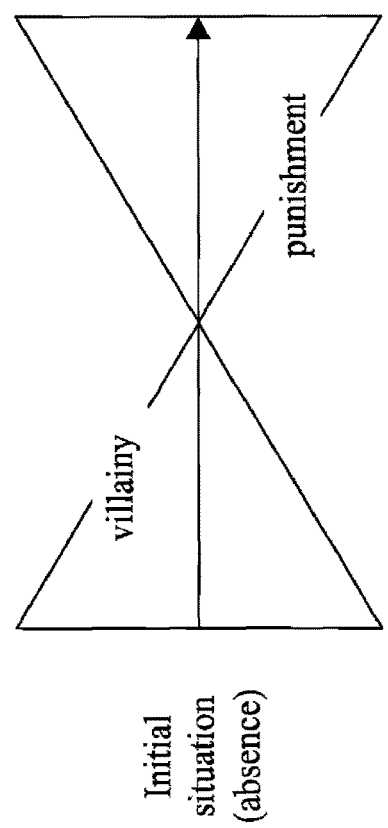
FIG. 2 illustrates the sequence of actions in the square.
Figure 3:
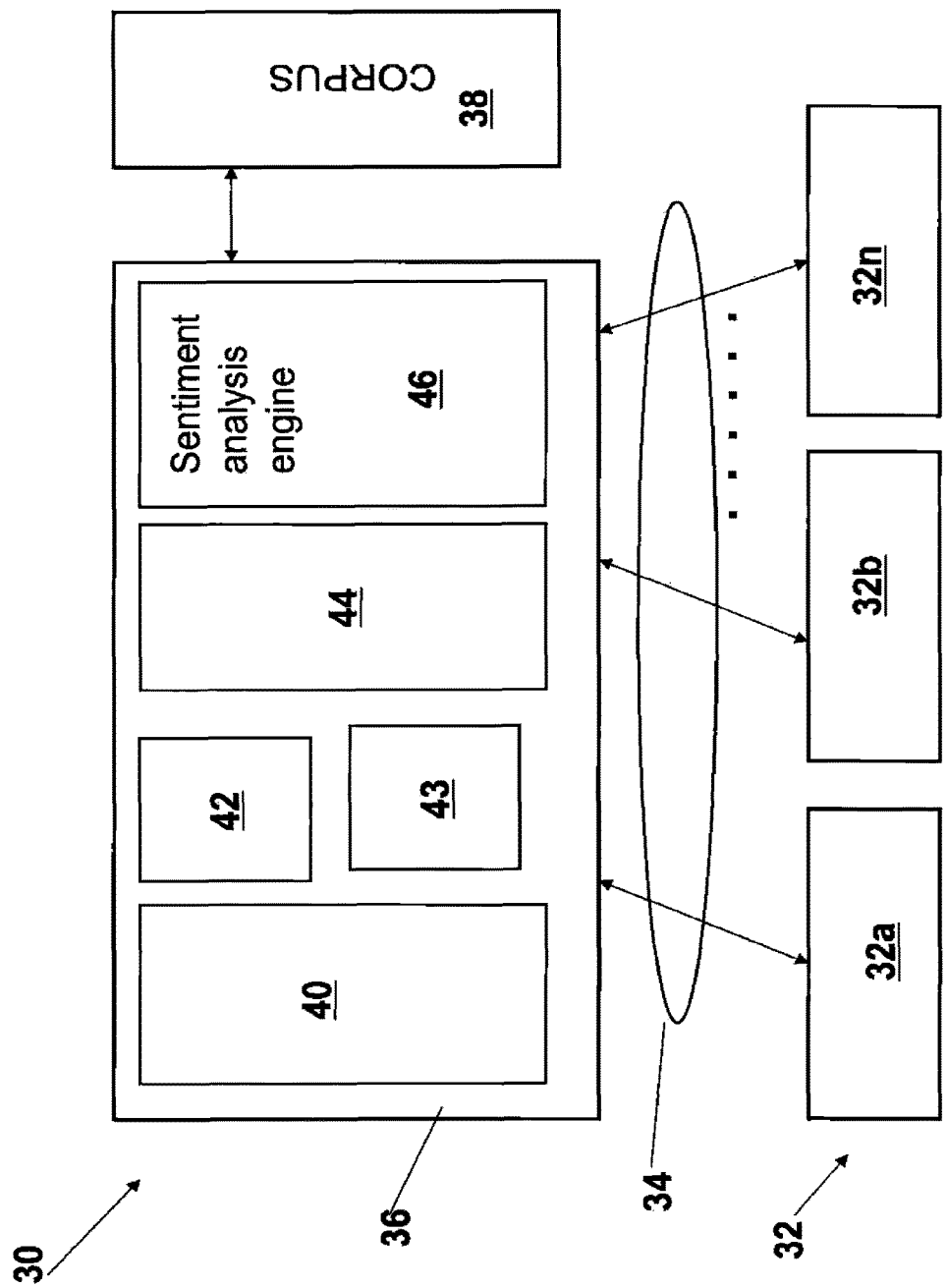
FIG. 3 illustrates a web-based implementation of a search system and/or sentiment analysis system implemented using a semiotic square library.

FIG. 3 illustrates a web-based implementation of a search system and/or sentiment analysis system 30 implemented using a semiotic square library. The system may include one or more devices 32 (such as devices 32a, 32b, . . . , 32n as shown in FIG. 3) that allow a user to connect to and interact with, over a link 34, a search and analysis system 36. Each device 32 may be a processing unit based device with sufficient processing power, memory and connectivity capabilities to be able to connect over the link to the search and analysis system 36. For example, each device 32 may be a personal computer, laptop computer, a mobile phone, a smart phone or the like. The link 34 may be a wired or wireless link, such as a communications network or computer network, wherein the link may be, for example, Ethernet, LAN, WLAN, WIFI, a cellular network, a digital data network (EDGE and the like), etc . . . The search and analysis system 36 may be implemented in one embodiment, as one or more typical server computers executing computer code that implement the various functions and operations of the search and analysis system 36 as described below. However, various elements of the search and analysis system 36 may also be implemented in hardware. In general, the search and analysis system 36 allows a user to access it via the link and perform searches or sentiment analysis using the semiotic square library that is described in more detail below.

The search and analysis system 36 may further comprise a known web server 40 (that may be implemented using a plurality of lines of computer code) that interacts with the devices 32 and serves web pages to those devices wherein the devices 32 may further comprise an software application, such as a browser, that allows the device 32 to establish a connection with the web server 40 and exchange data/information with the web server 40 such as web pages, forms to be filled in with data and results of an action requested by the user of the device such as search results and/or a sentiment analysis. The search and analysis system 36 may further comprise a semiotic square store 42 that may be implemented in software or hardware and stores a plurality of semiotic squares wherein the semiotic squares are described below in more detail. The plurality of semiotic squares allow the search and analysis system 36 to perform searches and sentiment analysis using the semiotic squares as described below in more detail. The search and analysis system 36 may also have a semiotic square generator unit 43 that generates, as described below, the semiotic squares that are stored in the semiotic square store 42.

The search and analysis system 36 may further comprise a search engine 44 (implemented as a plurality of lines of computer code in one embodiment although it can also be implemented in hardware) that receives a search request from a device 32 via the web server 40, performs a search in part based on the plurality of semiotic squares as described below in the corpus 38 and returns search results to the device 32, such as by having the web server 40 deliver a web page to the device although the search results can be delivered to the device 32 in a different manner. The search and analysis system 36 may further comprise a sentiment analysis engine 46 (implemented as a plurality of lines of computer code in one embodiment although it can also be implemented in hardware) that receives a sentiment analysis request from a device 32 via the web server 40, performs a sentiment analysis in part based on the plurality of semiotic squares as described below and returns the sentiment analysis results to the device 32, such as by having the web server 40 deliver a web page to the device although the search results can be delivered to the device 32 in a different manner. The corpus 38 may be a collection of data (documents, web pages, videos, etc.) that may be searched using the search engine 44 as described above. In addition, the corpus 38 may also be used in part to generate the semiotic squares using the semiotic square generator unit 43. Now, the semiotic square library generation method and model is described in more detail.

Figure 4:
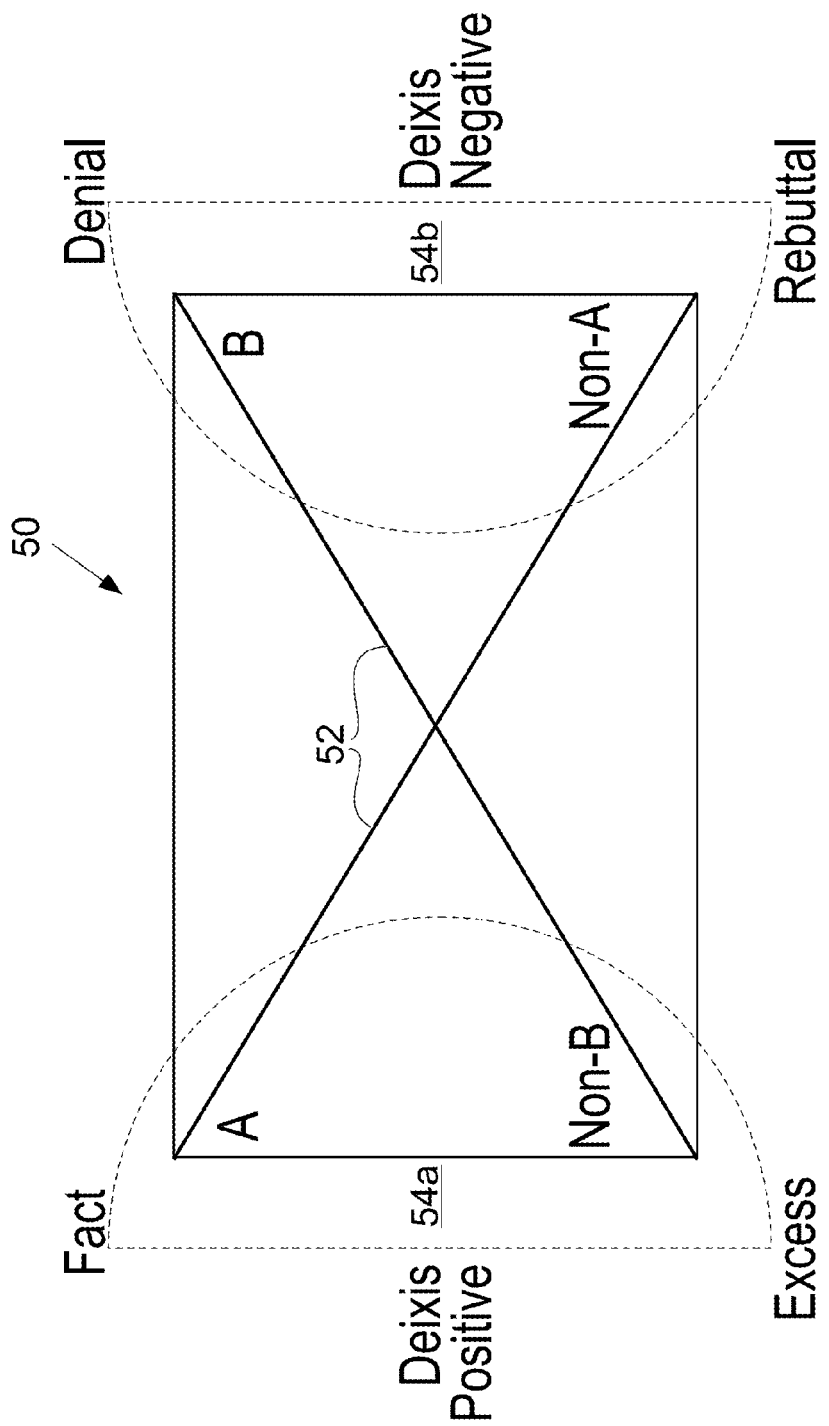
FIG. 4 illustrates a semiotic square model that can be used in a search system or a sentimental analysis system.

FIG. 4 illustrates a semiotic square model 50 that can be used in a search system or a sentimental analysis system. Unlike the typical semiotic square discussed above, the semiotic square model 50 is a model that allows a library of semiotic squares to be generated using the model. The first relationship is based on a diagonal contradiction 52 which is the presence/absence of a particular property such as Intelligence, Wealth, Appetite, Power, Beauty, Honesty, etc. As shown in FIG. 4, 2 pairs of diagonal contradictions 52 are obtained that are called A/Non-A, and B/Non-B as shown in FIG. 4. The second relationship is an opposition or antagonism of aims. For example, if appetite is aimed at eating, then anorexia is aimed at fasting. This is not a privative relationship, as anorexia is not defined by an absence of appetite, but instead by a willingness to not eat. In the model 50, A/Non-A is the contradiction between do and don't do and A/B is the opposition between do and do not. Far from being privative, the will is equipollent, but the outcome is oriented in an opposite direction.

In the semiotic square model 50, "A" is the A-ness which is the full realization of the property, the no nonsense summit, the factual one and "Non-A" is the failure, the absence, the un-A. "B" is the de-A, where A is deconstructed; this is a darker summit, where renouncement goes with deceit (renouncement to trust) or denial (renouncement to assertion). Finally, "Non-B" is the privation of this negative orientation, turning the same energy into an additive relationship.

The semiotic square model 50 may also have two Deixis 54 including a Deixis positive 54a and a Deixis negative 54b. The 2 "Deixis" are perspectives are pulled into antagonist directions by the 2 inversions of privative/additive and assertion/renouncement, resulting into 2 positive/negative sets. However the 2 Deixis are not exactly symmetrical. The Deixis positive 54a set of A/Non-B is roughly based on a gradation of degrees or presupposition of states with excess directly presupposes assertion and is a more intense state of the same. This is not true for the Deixis negative 54b in which denial (B) does not exactly suppose failure.

In order to respect the nuances of intensity attached to the model, the model may include two levels into each summit value (major, minor) resulting into 4 grades for each diagonal, e.g. Major assertion, minor assertion, minor failure, major failure. Now, the method for generating semiotic squares using the model is described in more detail.

Figure 5:
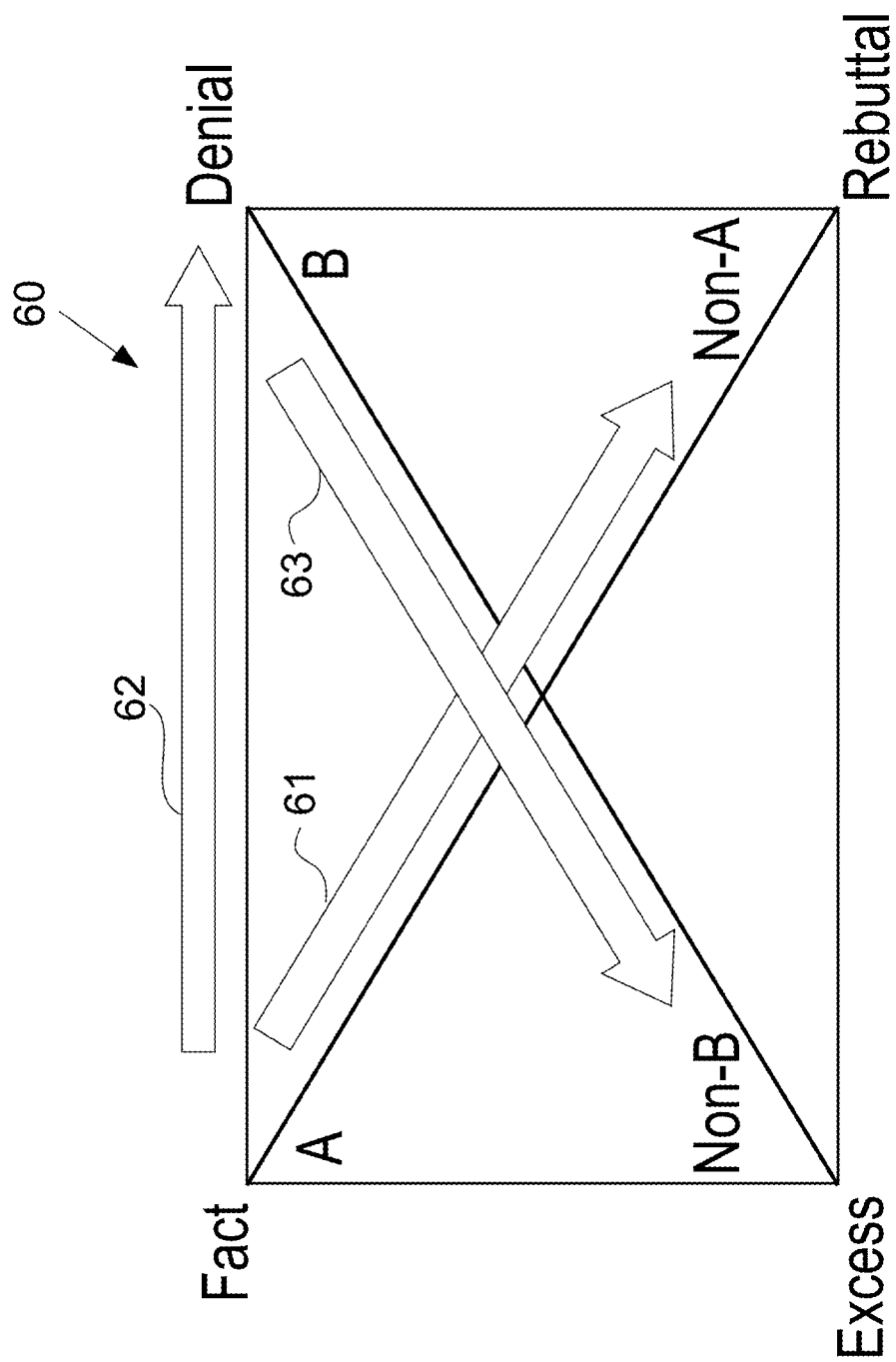
FIG. 5 illustrates a method for generating the semiotic square model that can be used in a search system or a sentimental analysis system.

FIG. 5 illustrates a method 60 for generating the semiotic square model 50 that can be used in a search system or a sentimental analysis system. In a first process, the method starts at "A" by determining the fact to focus on that is positive and is most often better expressed as a combination of an auxiliary and a property such as, for example, "want to eat", "can learn", "is beautiful", but not "refrain from smoking." In a second process 61, the non-A is generated by removing the property such as, for example, "doesn't want to eat=disgust, nausea" for "A"="want to eat", "cannot learn=uneducated" for "A"="can learn" or "is not beautiful=ugly" for "A"="is beautiful." In a third process 62, "B" is generated which gets back to A keeping the same willingness, but revert the direction such as, for example, "wants to eat (not)=anorexia" for "A"="want to eat", "can learn (not)=illiterate" for "A"="can learn" or "is beautiful (not)=neglected" for "A"="is beautiful." In a fourth process 63, the non-B is generated in which strength is added into the opposite direction such as, for example, "wants to eat (all)=gluttony" for "B"="wants to eat (not)=anorexia", "can learn (all)=savant" for "B"="can learn (not)=illiterate" or "is beautiful (all)=charming" for "B"="is beautiful (not)=neglected".

Using the model and method shown in FIGS. 4 and 5, a library of semiotic squares used by the system and method shown in FIG. 3 may be generated. The complete set of semiotic squares may be generated by changing the modes of assertion: Obligation, Ability, etc. The shift of modes can use the method in that, from one series to the next, the system generates the same balance of assertions and denials, resulting in a transmodal meta-model of facts, rebuttals, denials and excesses, such as for example, shown in the Table A below:

| | A | Non-A | B | Non-B |
|---|---|---|---|---|
| Desire | Appetite | Nausea | Anorexia | Gluttony |
| Confidence | Trust | Distrust | Deceit | Loyalty |
| Competence | Skill | Incompetence | Careless | Scrupulous |

-continued

| | A | Non-A | B | Non-B |
|---|---|---|---|---|
| Pleasure | Joy | Sorrow | Contrition | Ecstasy |
| Attitude | Assertive | Servile | Denial | Flamboyant |

Figure 6:
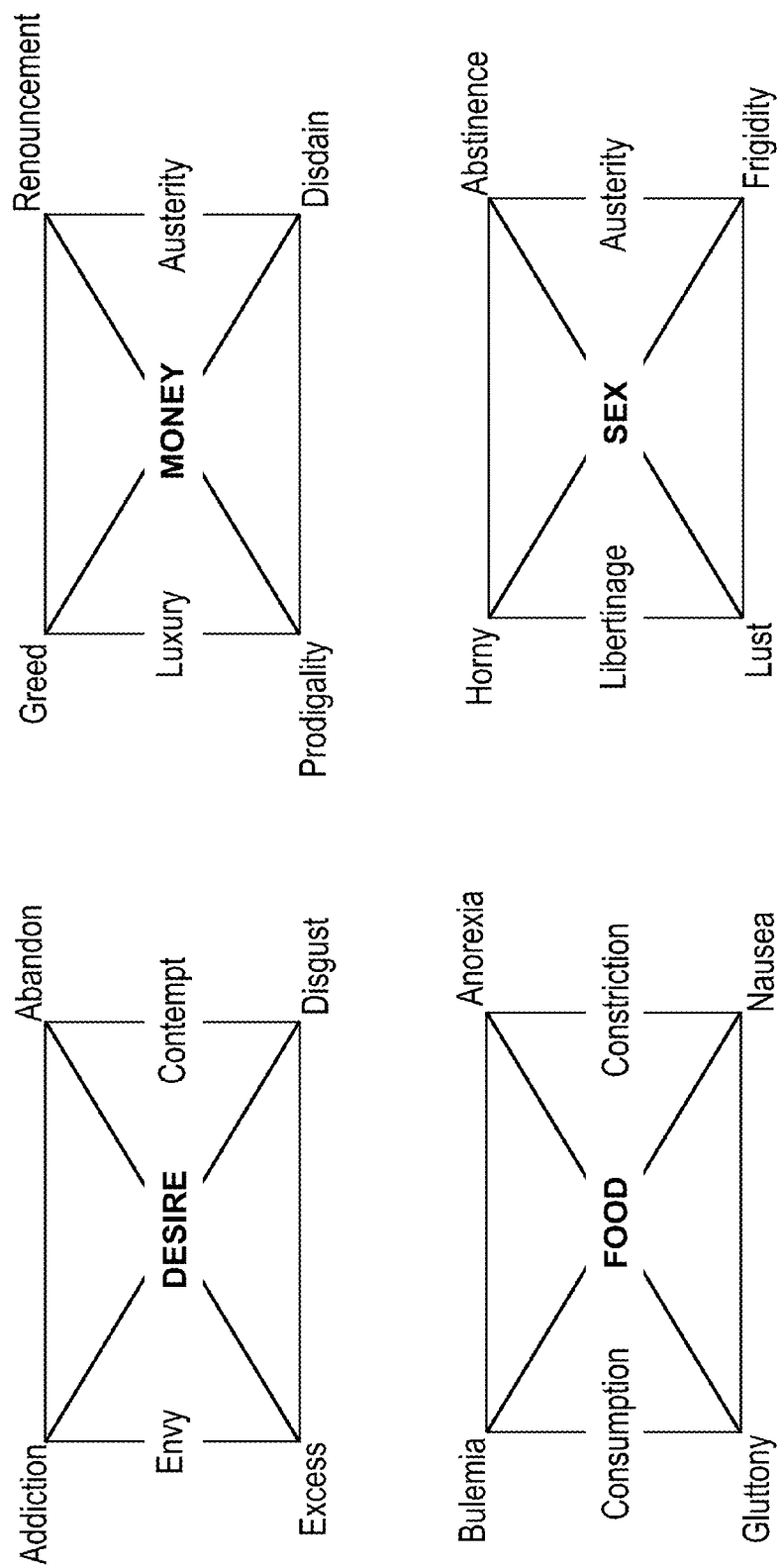
FIG. 6 illustrates examples of semiotic square for a desire property.
Figure 7:
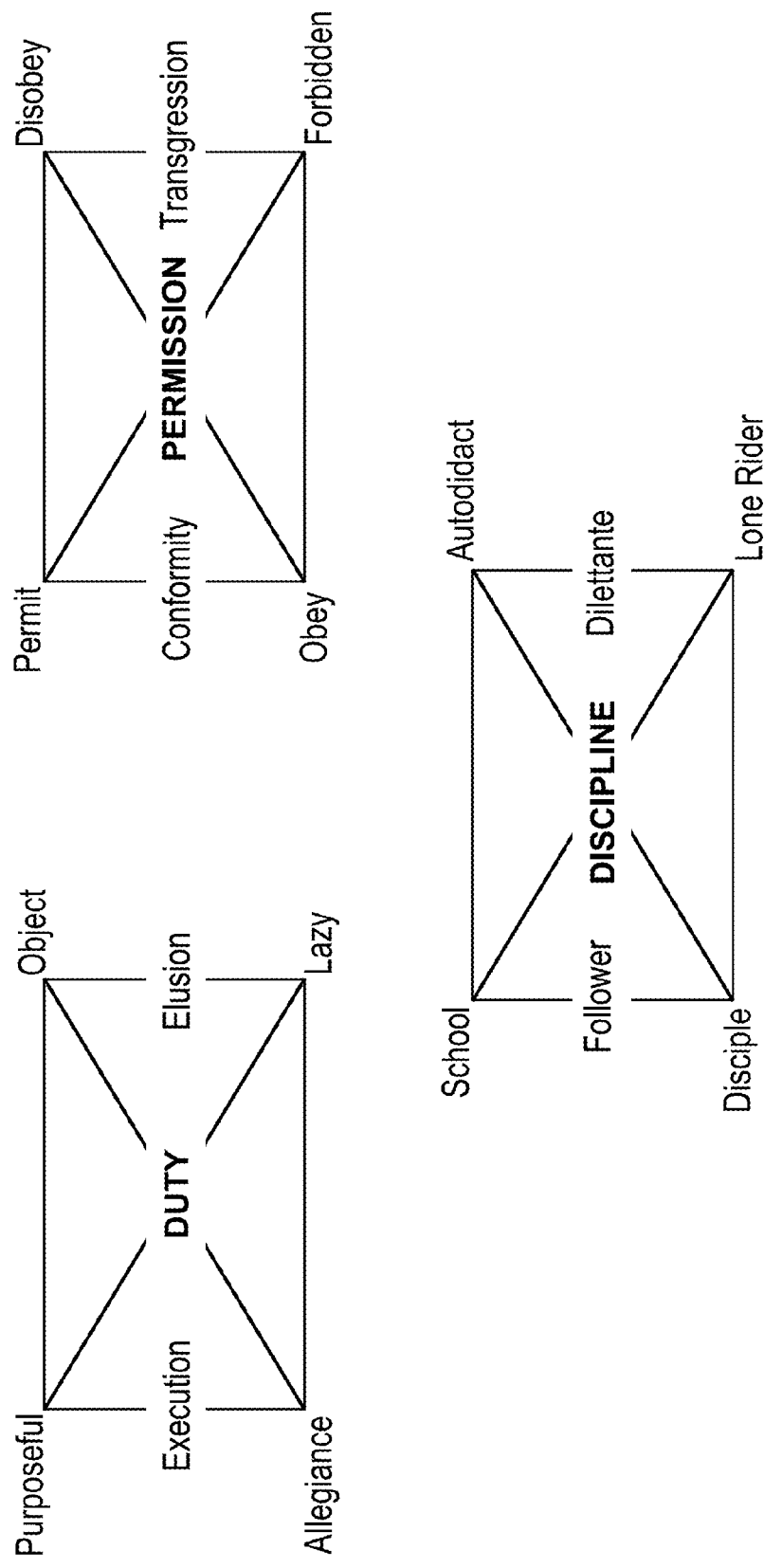
FIG. 7 illustrates examples of semiotic square for a deontic property.
Figure 8:
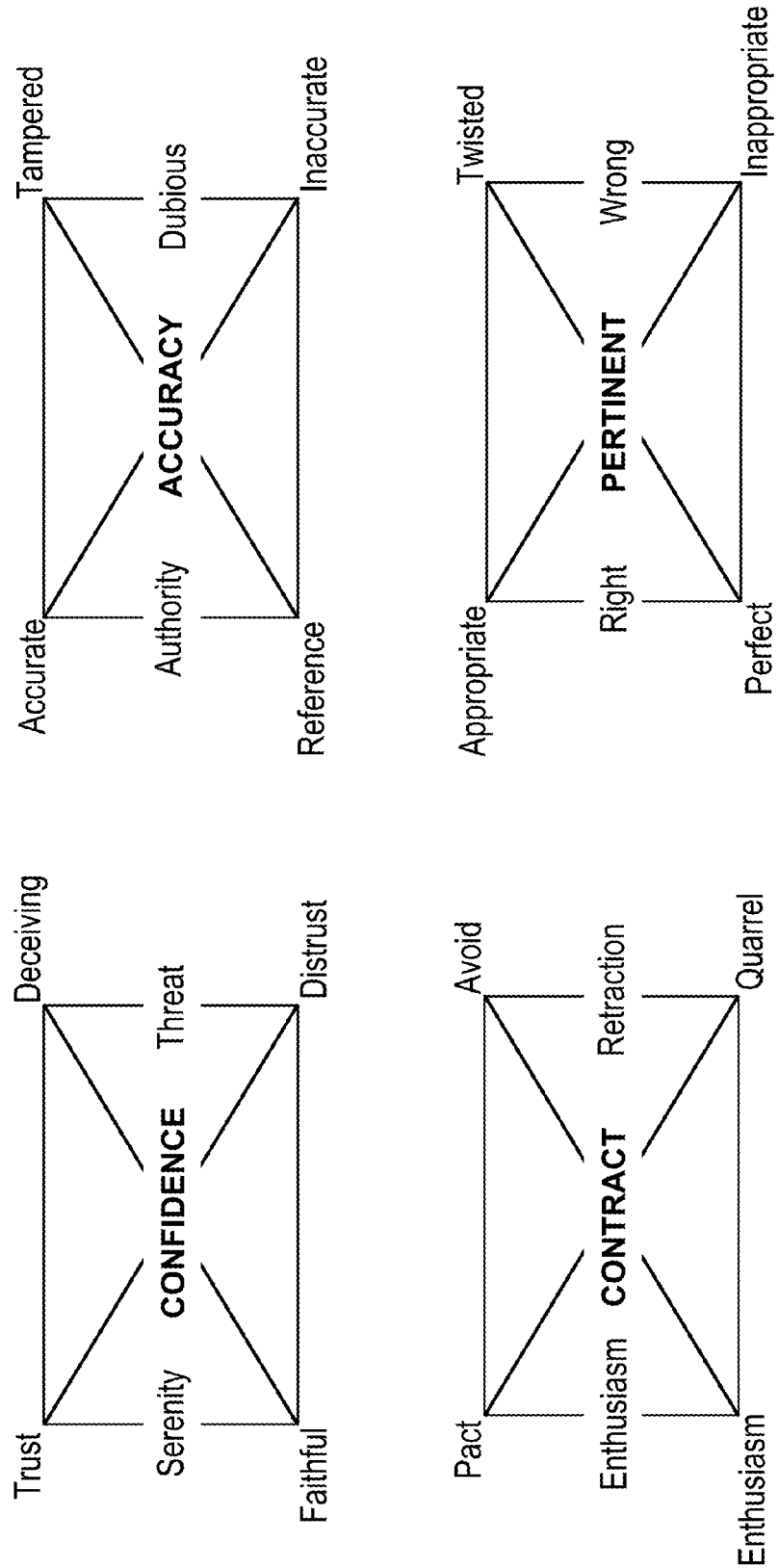
FIG. 8 illustrates examples of semiotic square for a trust property.
Figure 9:
FIG. 9 illustrates examples of semiotic square for an ability property.

The following dimensions organize the library of "Sentiments":
1. Modal fundamentals
   a. Power (will)
   b. Desire (want)
   c. Morals
      1. Deontic, i.e. Obligation, Duty (must)
      2. Contract (trust)
   d. Ability, Knowledge (can, know)
2. Axiology
   a. Aesthetics
   b. Ethics
3. Thymic
   a. Emotions FIG. 6 illustrates examples of semiotic square for a desire property, such as for example, a desire semiotic square having the "A", "non-A", "B" and "non-B" values shown, a money semiotic square having the "A", "non-A", "B" and "non-B" values shown, a food semiotic square having the "A", "non-A", "B" and "non-B" values shown and a sex semiotic square having the "A", "non-A", "B" and "non-B" values shown. Similarly, FIG. 7 illustrates examples of semiotic square for a deontic property, such as for example, a duty semiotic square having the "A", "non-A", "B" and "non-B" values shown, a permission semiotic square having the "A", "non-A", "B" and "non-B" values shown and a discipline semiotic square having the "A", "non-A", "B" and "non-B" values shown. FIG. 8 illustrates examples of semiotic square for a trust property, such as for example, a confidence semiotic square having the "A", "non-A", "B" and "non-B" values shown, an accuracy semiotic square having the "A", "non-A", "B" and "non-B" values shown, a contract semiotic square having the "A", "non-A", "B" and "non-B" values shown and a pertinent semiotic square having the "A", "non-A", "B" and "non-B" values shown. FIG. 9 illustrates examples of semiotic square for an ability property, such as for example, a competence semiotic square having the "A", "non-A", "B" and "non-B" values shown and a disposition semiotic square having the "A", "non-A", "B" and "non-B" values shown.

Figure 10:
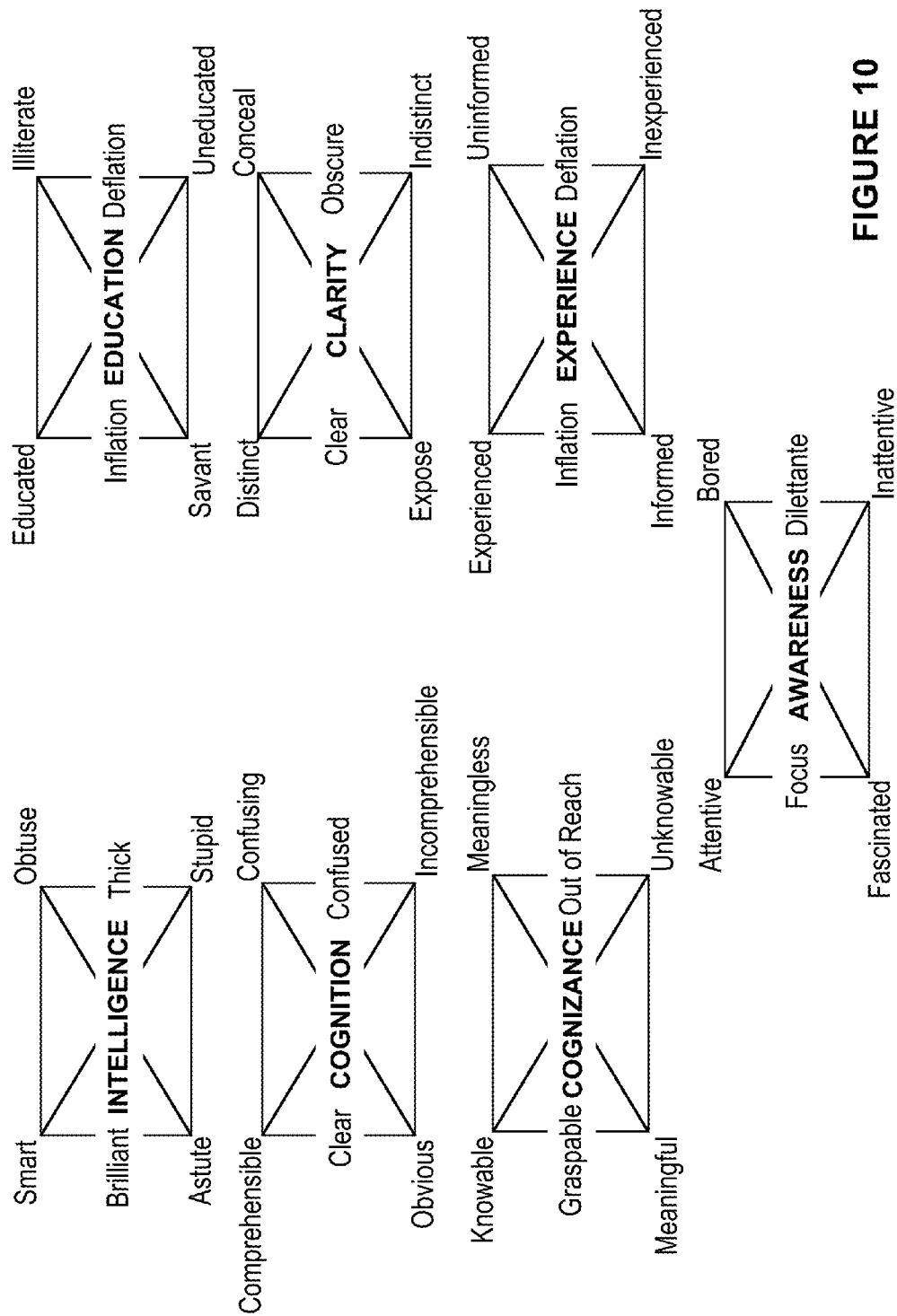
FIG. 10 illustrates examples of semiotic square for a knowledge property.
Figure 11:
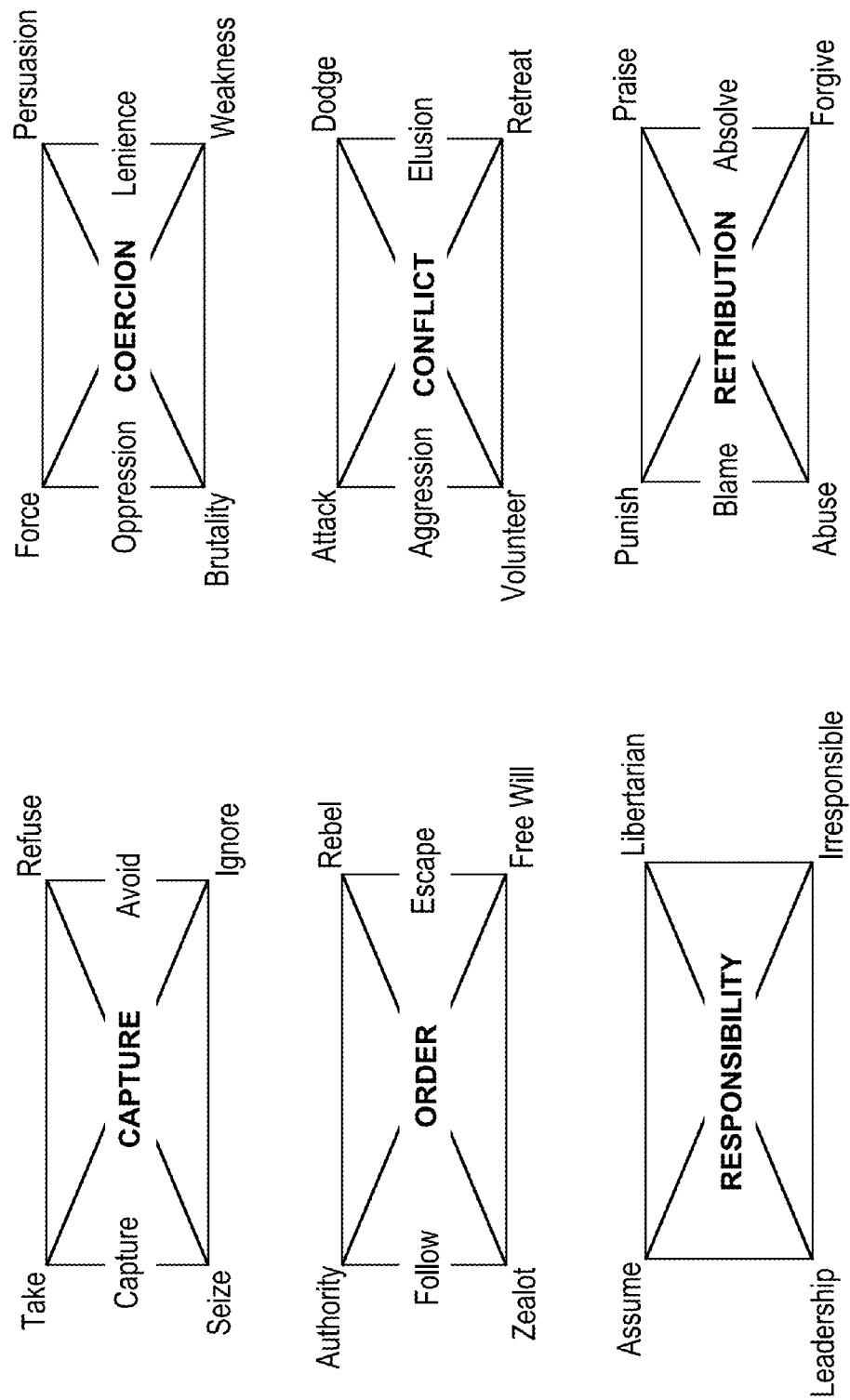
FIG. 11 illustrates examples of semiotic square for a power property.

FIG. 10 illustrates examples of semiotic square for a knowledge property, such as for example, a intelligence semiotic square having the "A", "non-A", "B" and "non-B" values shown, an education semiotic square having the "A", "non-A", "B" and "non-B" values shown, a cognition semiotic square having the "A", "non-A", "B" and "non-B" values shown and a pertinent semiotic square having the "A", "non-A", "B" and "non-B" values shown, a clarity semiotic square having the "A", "non-A", "B" and "non-B" values shown and a pertinent semiotic square having the "A", "non-A", "B" and "non-B" values shown, a cognizance semiotic square having the "A", "non-A", "B" and "non-B" values shown and a pertinent semiotic square having the "A", "non-A", "B" and "non-B" values shown, an experience semiotic square having the "A", "non-A", "B" and "non-B" values shown and a pertinent semiotic square having the "A", "non-A", "B" and "non-B" values shown and an awareness semiotic square having the "A", "non-A", "B" and "non-B" values shown and a pertinent semiotic square having the "A", "non-A", "B" and "non-B" values shown. FIG. 11 illustrates examples of semiotic square for a power property, such as for example, a capture semiotic square having the "A", "non-A", "B" and "non-B" values shown, a coercion semiotic square having the "A", "non-A", "B" and "non-B" values shown, an order semiotic square having the "A", "non-A", "B" and "non-B" values shown, a conflict semiotic square having the "A", "non-A", "B" and "non-B" values shown, a responsibility semiotic square having the "A", "non-A", "B" and "non-B" values shown and a retribution semiotic square having the "A", "non-A", "B" and "non-B" values shown.

Figure 12:
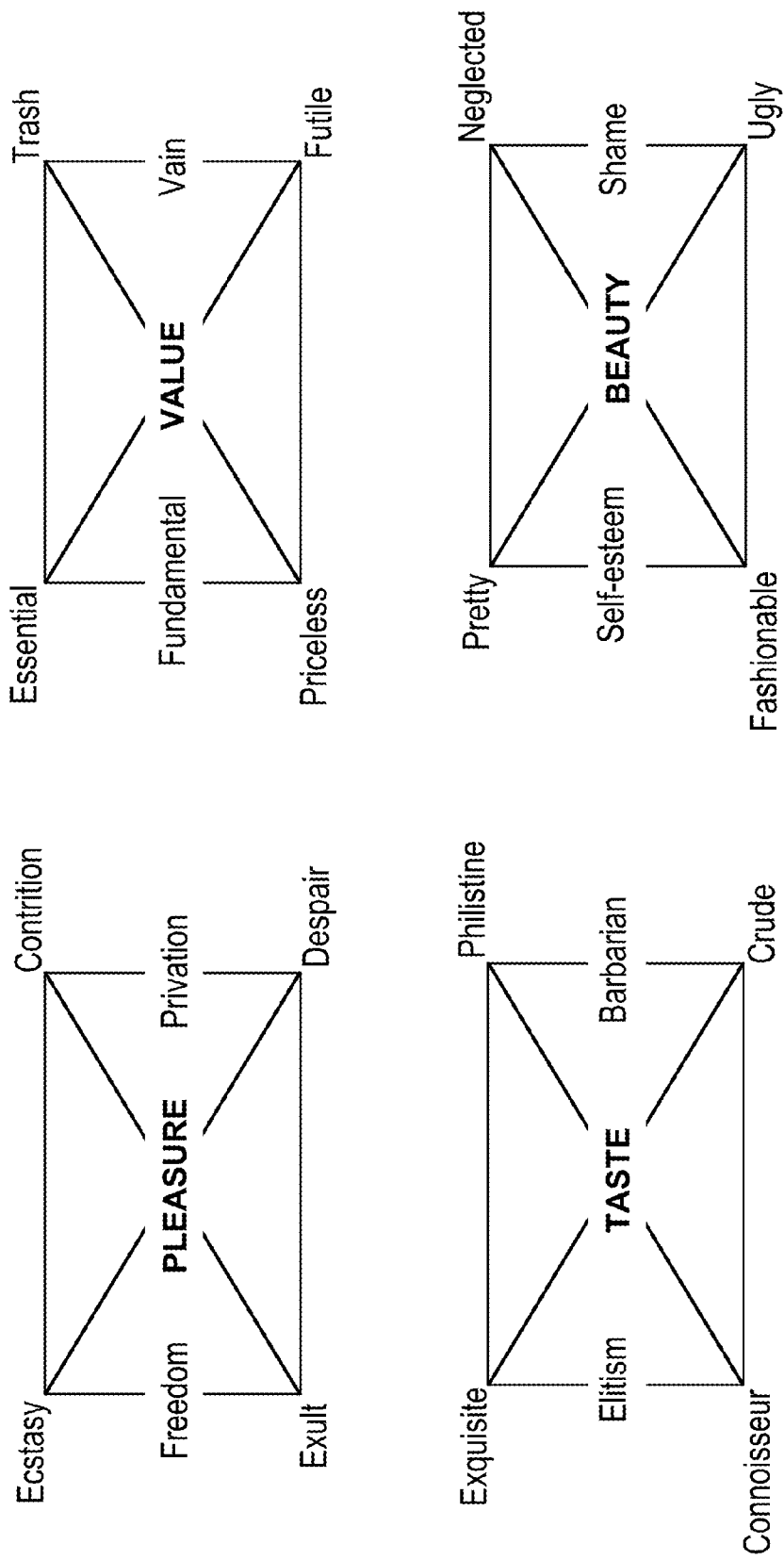
FIG. 12 illustrates examples of semiotic square for an aesthetics property.
Figure 13A:
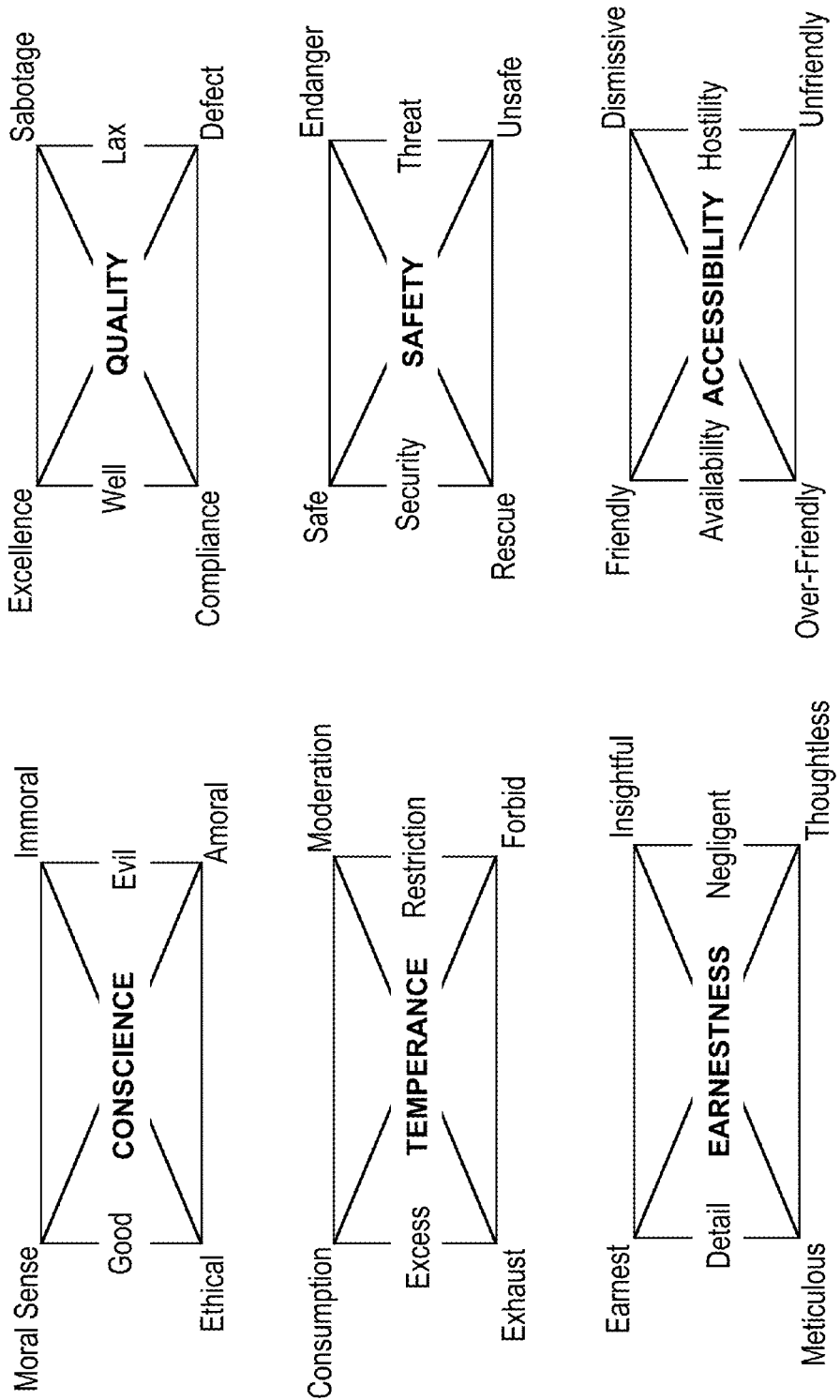
FIGS. 13A and 13B illustrate examples of semiotic square for an ethics property.
Figure 13B:
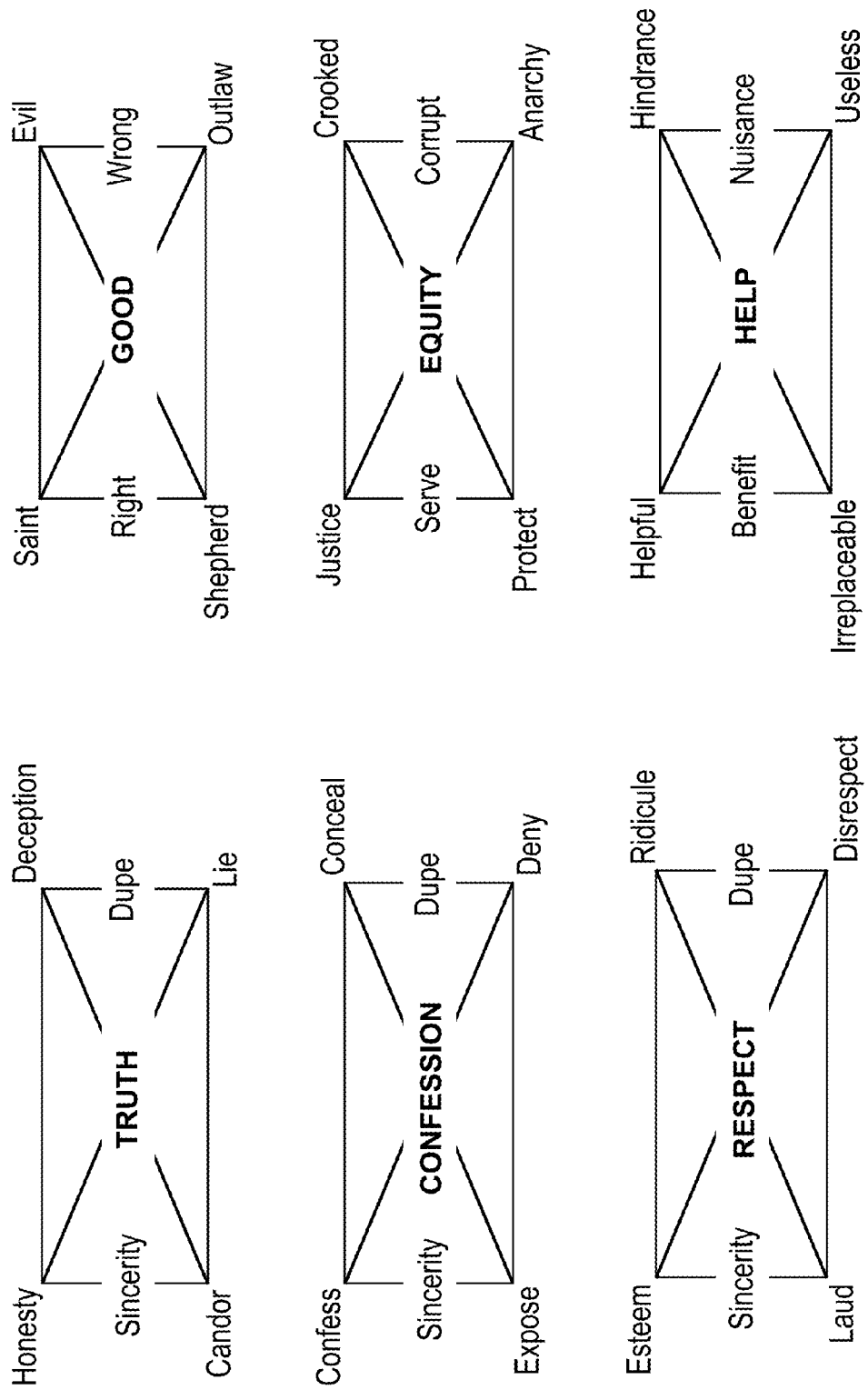

FIG. 12 illustrates examples of semiotic square for an aesthetics property, such as for example, a pleasure semiotic square having the "A", "non-A", "B" and "non-B" values shown, a value semiotic square having the "A", "non-A", "B" and "non-B" values shown, a taste semiotic square having the "A", "non-A", "B" and "non-B" values shown and a beauty semiotic square having the "A", "non-A", "B" and "non-B" values shown. FIGS. 13A and 13B illustrate examples of semiotic square for an ethics property, such as for example, a conscience semiotic square having the "A", "non-A", "B" and "non-B" values shown, a quality semiotic square having the "A", "non-A", "B" and "non-B" values shown, a temperance semiotic square having the "A", "non-A", "B" and "non-B" values shown, a safety semiotic square having the "A", "non-A", "B" and "non-B" values shown, an earnestness semiotic square having the "A", "non-A", "B" and "non-B" values shown, an accessibility semiotic square having the "A", "non-A", "B" and "non-B" values shown, a truth semiotic square having the "A", "non-A", "B" and "non-B" values shown, a good semiotic square having the "A", "non-A", "B" and "non-B" values shown, a confession semiotic square having the "A", "non-A", "B" and "non-B" values shown, an equity semiotic square having the "A", "non-A", "B" and "non-B" values shown, a respect semiotic square having the "A", "non-A", "B" and "non-B" values shown and a help semiotic square having the "A", "non-A", "B" and "non-B" values shown.

Figure 14:
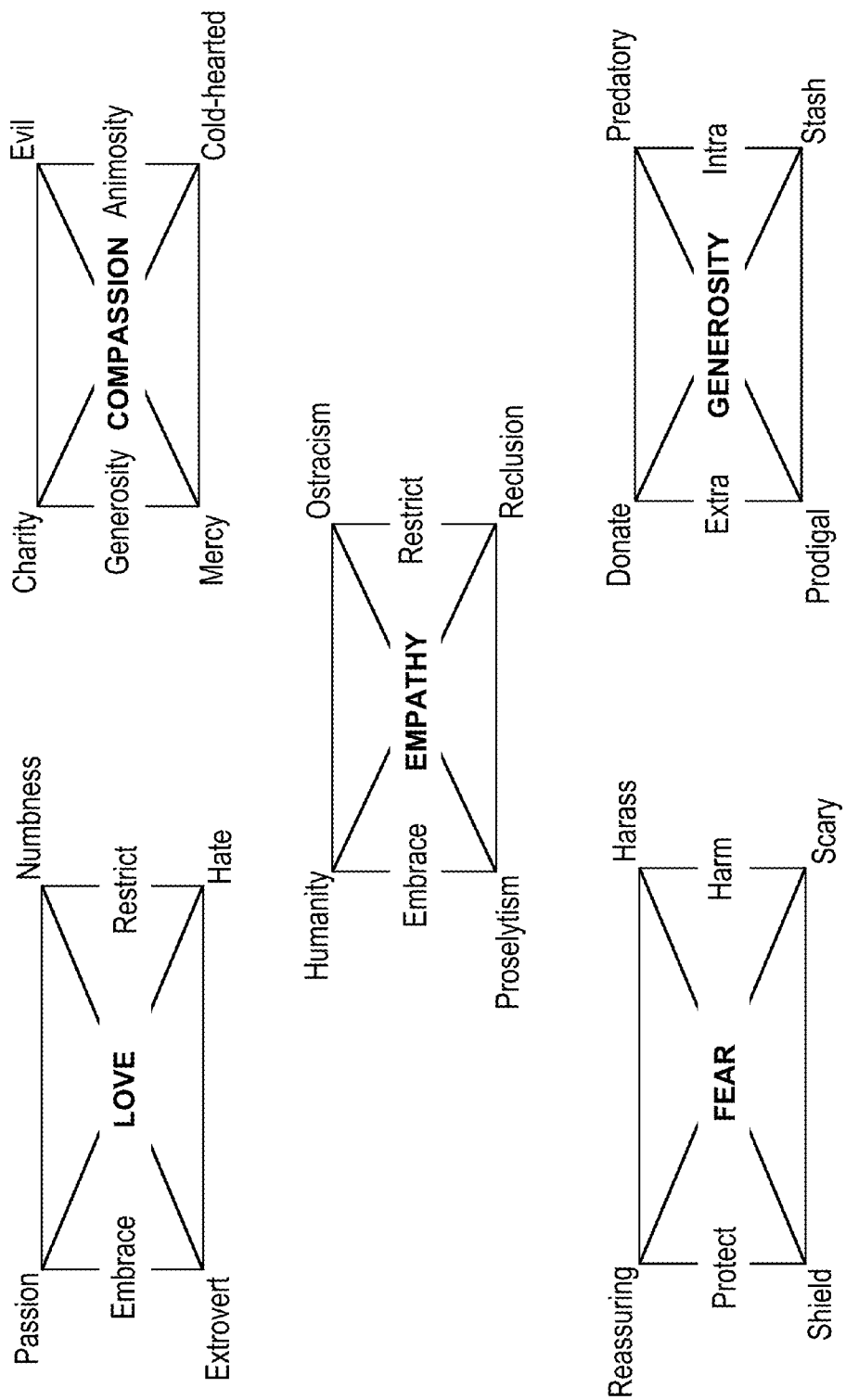
FIG. 14 illustrates examples of semiotic square for a thymic property.
Figure 15A:
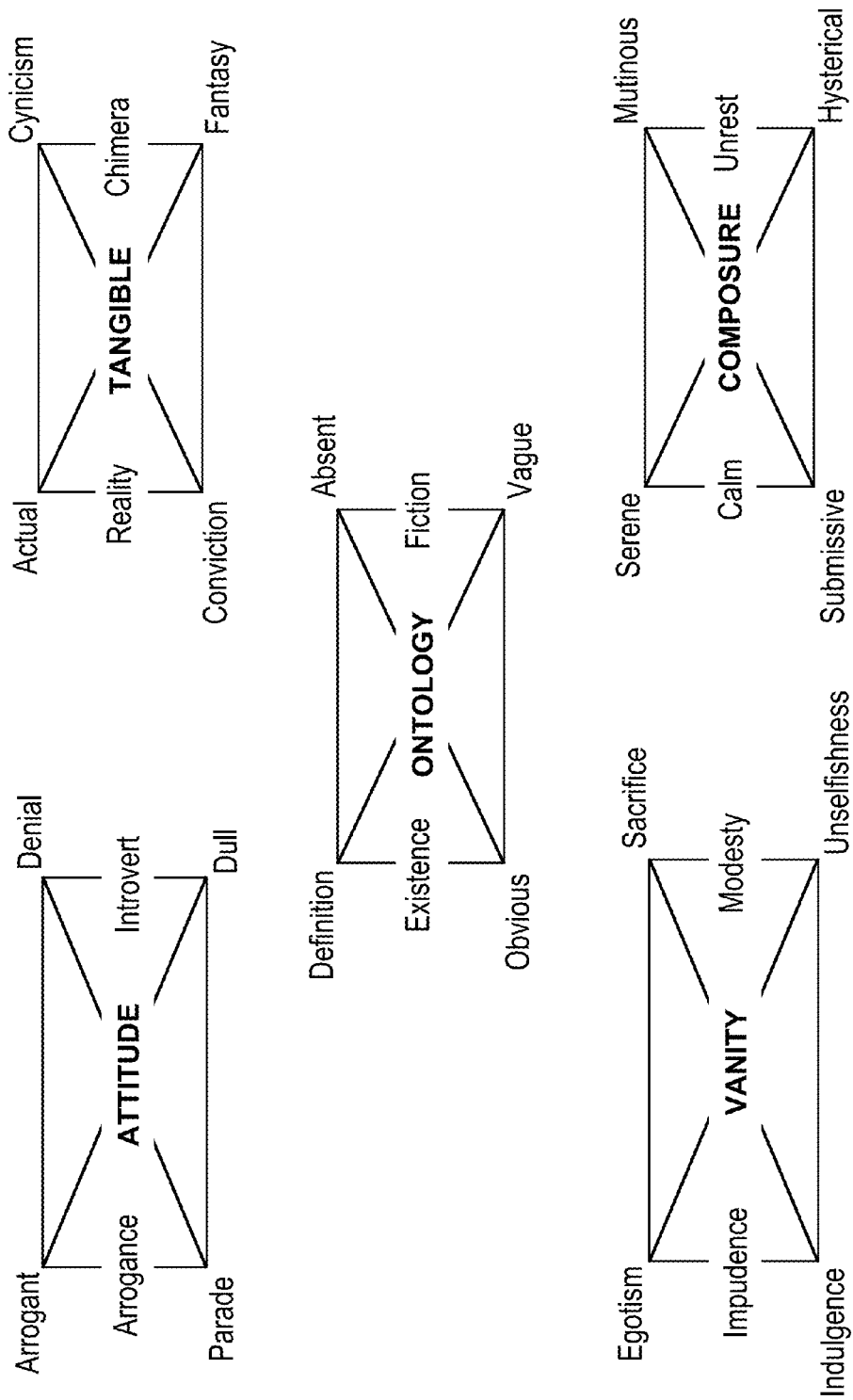
FIGS. 15A-15C illustrate examples of semiotic square for a posture property.
Figure 15B:
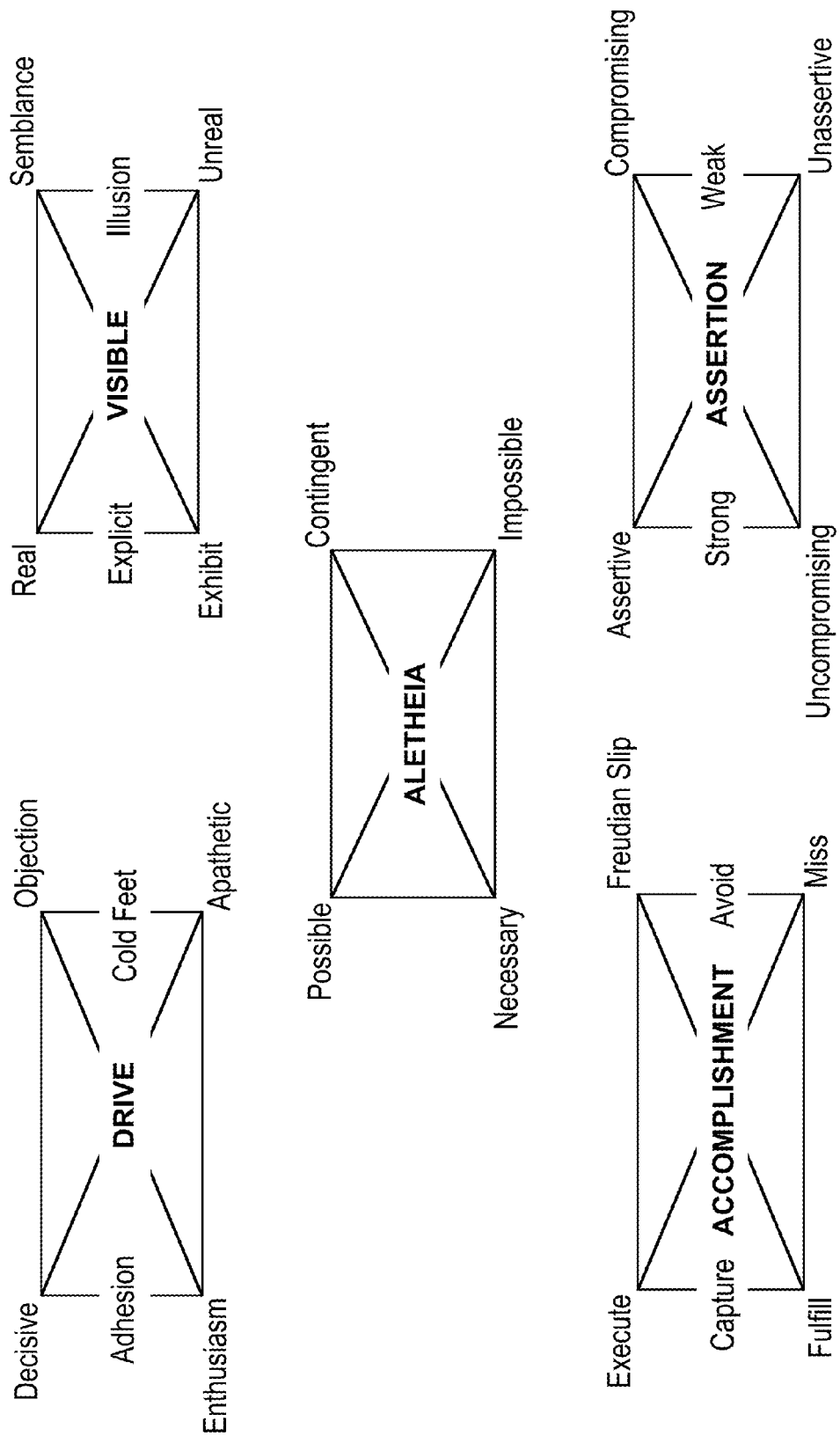
Figure 15C:
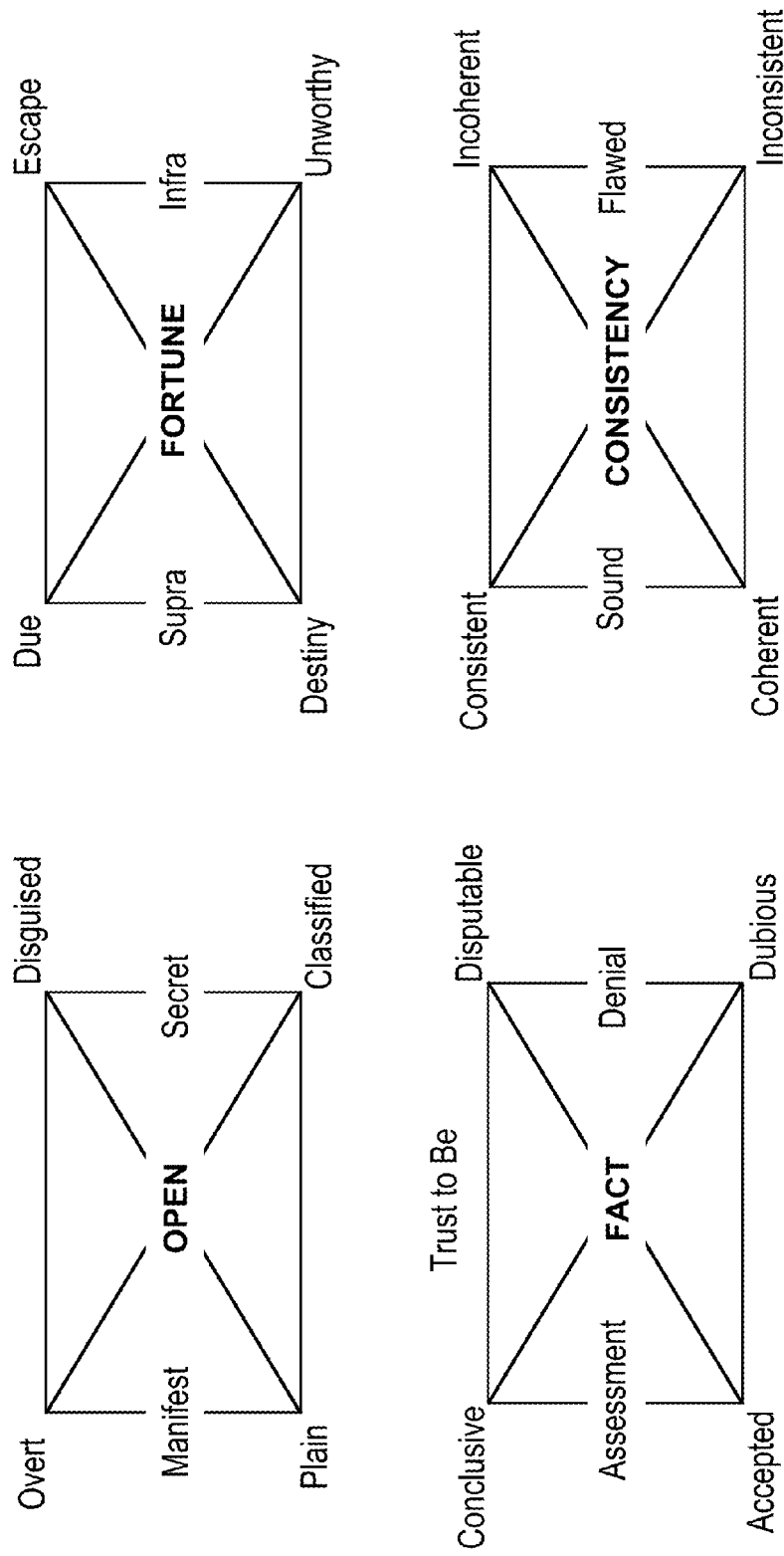
Figures 16, 17:
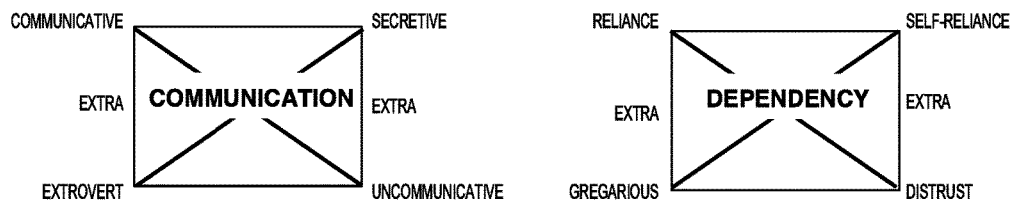
FIG. 16 illustrates examples of semiotic square for a self/others property.
FIG. 17 illustrates a generic thesaurus data structure for a thesaurus implementation of the semiotic squares library.

FIG. 14 illustrates examples of semiotic square for a thymic property, such as for example, a love semiotic square having the "A", "non-A", "B" and "non-B" values shown, a compassion semiotic square having the "A", "non-A", "B" and "non-B" values shown, an empathy semiotic square having the "A", "non-A", "B" and "non-B" values shown, a hear semiotic square having the "A", "non-A", "B" and "non-B" values shown and a generosity semiotic square having the "A", "non-A", "B" and "non-B" values shown. FIGS. 15A-15C illustrate examples of semiotic square for a posture property, such as for example, an attitude semiotic square having the "A", "non-A", "B" and "non-B" values shown, a tangible semiotic square having the "A", "non-A", "B" and "non-B" values shown, an ontology semiotic square having the "A", "non-A", "B" and "non-B" values shown, a vanity semiotic square having the "A", "non-A", "B" and "non-B" values shown, a composure semiotic square having the "A", "non-A", "B" and "non-B" values shown, a drive semiotic square having the "A", "non-A", "B" and "non-B" values shown, a visible semiotic square having the "A", "non-A", "B" and "non-B" values shown, an aletheia semiotic square having the "A", "non-A", "B" and "non-B" values shown, an accomplishment semiotic square having the "A", "non-A", "B" and "non-B" values shown, an assertion semiotic square having the "A", "non-A", "B" and "non-B" values shown, an open semiotic square having the "A", "non-A", "B" and "non-B" values shown, a fortune semiotic square having the "A", "non-A", "B" and "non-B" values shown, a fact semiotic square having the "A", "non-A", "B" and "non-B" values shown, and a consistency semiotic square having the "A", "non-A", "B" and "non-B" values shown. FIG. 16 illustrates examples of semiotic square for a self/others property, such as for example, a communication semiotic square having the "A", "non-A", "B" and "non-B" values shown and a dependency semiotic square having the "A", "non-A", "B" and "non-B" values shown.

All of the examples of semiotic squares for different properties can be combined together to form the semiotic square library. The model and library of semiotic squares and the storage of the library may be implemented in several different manners. In particular, the library may be stored in a hardware device or software store. The library may be generated and stored in the form of a thesaurus or may be generated and stored using indexing. In addition, the library of semiotic squares may be implemented using other methods/systems that are capable of generating and storing the library of semiotic squares. Now, two examples of implementations of the semiotic square library are described in more detail.

Thesaurus Implementation

In one implementation, the library of semiotic squares may be stored in a thesaurus data structure in which the generic thesaurus data structure may be as shown in FIG. 17 and an example of the thesaurus for a particular semiotic square is shown in FIG. 18. The thesaurus data structure may include semiotic square labels including semiotic markers (an example of which is shown in FIG. 19) where the above generic format may be modified to include semiotic prefixes: SP, combined with 4 semiotic positions: A, Non-A, B, Non-B as shown in FIG. 19. The generic thesaurus format also may be modified to include semiotic intensity as shown in FIG. 20: SI, combined with 2 levels: High, Mild (Neutral is the center of the square) as shown in FIG. 20. Thus, a portion of the thesaurus for a particular semiotic square may be stored in the thesaurus as shown in FIG. 21.

Indexing Implementation

The indexing implementation may include the processes of tokenization, syntactic analysis, categorization, sentiment/concept building and sentiment grids as described below.

Tokenization

The tokenization process breaks the input text in tokens: keywords, separators and punctuation. The tokenizer then reduces keywords to their stem, expands contraction forms (possessive, auxiliary, negative forms, etc.), and detects idioms. All of the tokens may also be tagged with part-of-speech markers.

Using morphology analysis and stemming, the tokenizer, in addition to the generic stemming of plurals, reduces nouns, adverbs and adjectives to their core form if necessary in order to reduce the length of the thesaurus lists of synonyms to a manageable size. For example, the stemming may be:

Greediness->greedy->greed

Economically->economic

Infectious->infect

However, this reduction is language dependent: Prochainement->prochaine->prochain The tokenizer may detect idiomatic phases and the semiotic thesaurus may includes many idioms, which have to be handled with specific care (vs. keyword entries which can be directly paired with tokens) as shown in FIG. 22.

Syntactic Analysis

The syntactic parser applies specific rules on top of the tokenizer, and builds a hierarchical representation of the syntax which isolates the qualificatory components and prepares for the semiotic analysis of the sentiments typically expressed by adverbs and adjectives. Note that the syntactic parser is multi-lingual. In the example shown in FIGS. 23A-23B, a sentence is analyzed against a basic SVO parsing structure are part-of-speech are associated with syntactic components ("PRF"=Preposition), qualifying components are pulled out from their phrasal context ("cosmetic"), idioms are recognized ("dior homme dermo system"), and semiotic markers are associated with some qualifiers ("care" is A, High, and Deixis is Positive).

Categorization

During the categorization process of the indexing implementation, the noun phrases located in the parsing tree are matched with the relevant thesauri: vertical content (i.e. cosmetics) and semiotic thesaurus. The result is a hierarchy of categories coming from the thesauri, on top of concepts extracted from the noun phrases. In the example shown in FIG. 24, Desire and Compassion refer to semiotic squares, while the other top categories refer to Properties (Style), Health (Skin Disorders) or Cosmetics (Brands).

Sentiment/Concept Binding

The final step of the semiotic implementation "binds" the sentiments to categories. In one implementation, the binding may be done by pairing the qualifying constituents of the parsing tree with the "nouns" (nouns or idioms standing for nouns) which they qualify. The binding patterns may include:

Noun+Qualifier (Adjective or Adverb).

Other patterns cross the boundaries of the noun phrase:

Noun+Auxiliary+Qualifier

Noun+Preposition+Qualifier

Qualifier+Preposition+Noun etc.

Some short adverbs ("very", "more", "much", etc.) add a level of intensity to qualifiers and they are processed accordingly to adjust the semiotic intensity of the qualifier.

In addition, true negation ("not"), in plain or contracted form, is used to revert the semiotic value of the qualifier: "not happy"="unhappy".

Sentiments Grid

The result of the semiotic analysis is a grid binding categories with their sentiment value as shown in FIG. 25. Given any specific category, on the one hand this category is bound to one or several thesauri, vertical or semiotic, and this can be expressed by lineages of broader terms; on the other hand this category is also bound to a qualifying context which has specific semiotic values: semiotic square position and intensity. The combination of these two sets of references allows a multiplicity of perspectives, intersecting with classes of positive and negative Deixis.

Now, several examples of how the semiotic analysis and semiotic square library may be used is described in more detail including a search example and a sentiment analytics example.

Search Example

The semiotic thesauri can be used to expand a query to all its narrower constituents. This is true for vertical categories, like "Skin Disorders" in vertical Health, highlighting "wrinkles" and "eczema" as shown in the example in FIG. 26.

Figure 27:
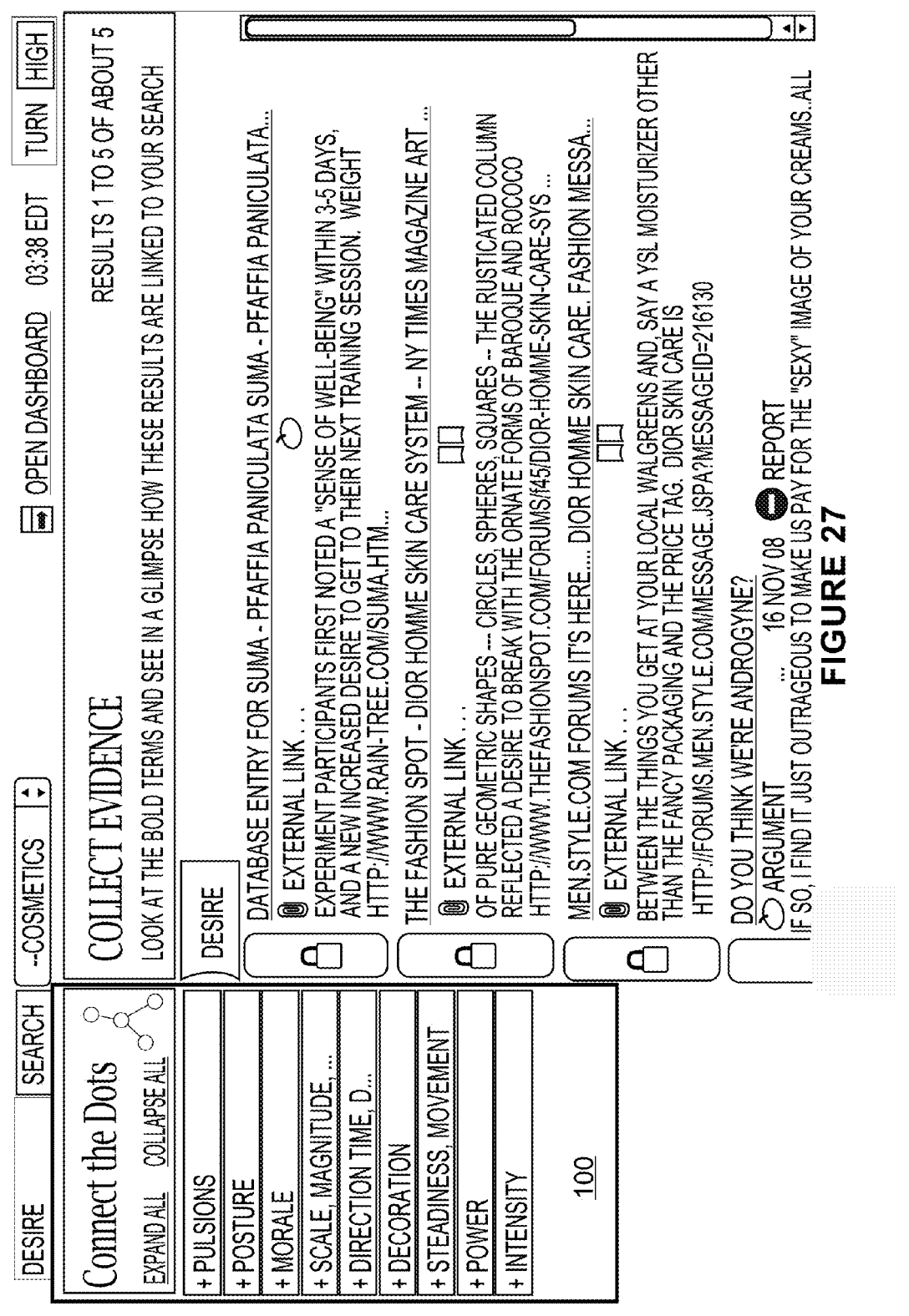

This is also true for semiotic categories, like "Desire": As shown in FIG. 27, the highlighted "outrageous" excess of desire, attached in this context to "the 'sexy' image of your creams". This shows the power of square representation of sentiments, versus conventional scales.

Figure 26:
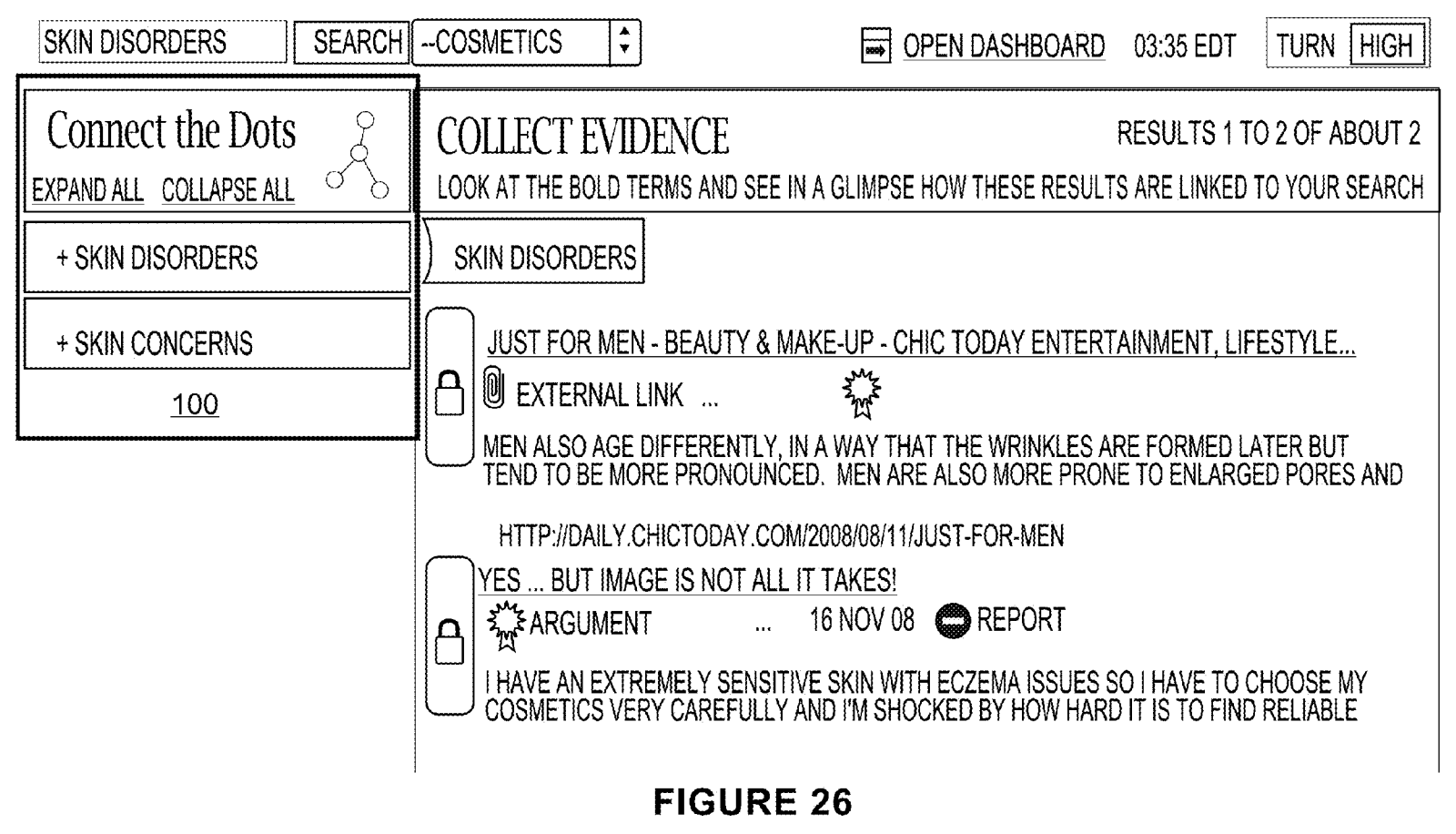

In both FIGS. 26 and 27, a left hand side 100 of the user interface lists one or more semiotic facets that have been collected as a result of the query that come from various thesauri. In the previous example in FIG. 27, "Pulsions", "Posture", "Morale" and "Power" come from the semiotic thesaurus.

Sentiment Analytics Example

Figure 28:
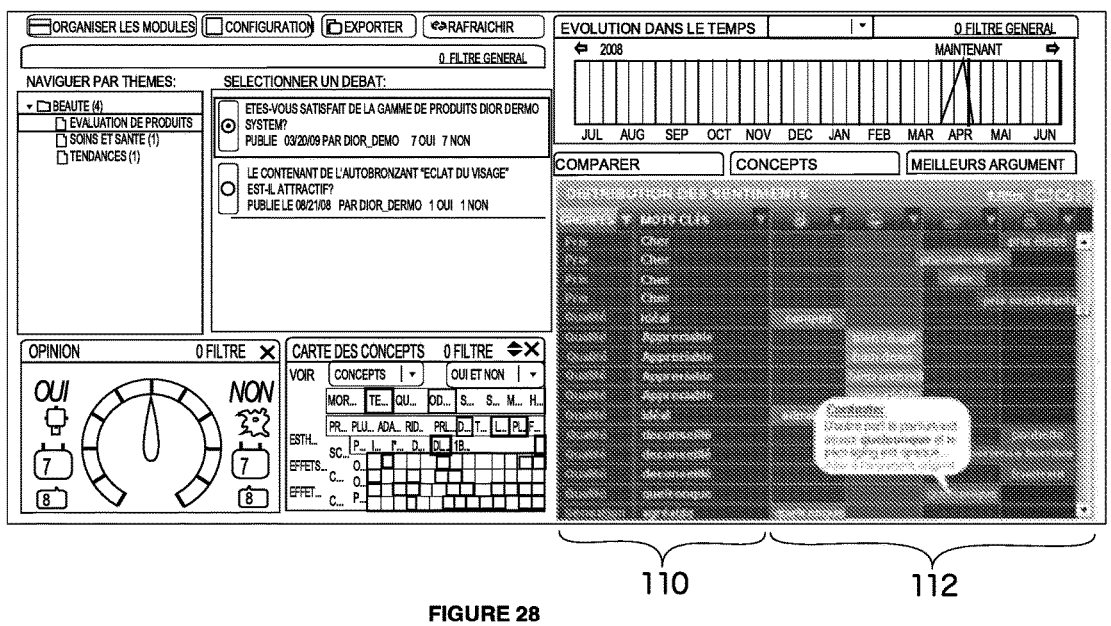
FIG. 28 illustrates an example of a sentiment analytics using the semiotic system.

FIG. 28 illustrates an example of a sentiment analytics using the semiotic system using semiotic widgets. The example of FIG. 28 shows that narrower and broader categories 110 (blue left) can be sorted to show their qualifying context 112 on the right. The sets of semiotic values (green=positive and red=negative, shades of green and red express intensity) can also be sorted to consider all the positives and negatives at once.

Additional representations allow to leverage further the sophistication of the semiotic model. For instance a square graphical representation allows the mapping at once all the semiotic positions of the qualifiers and their context.

Figure 29:
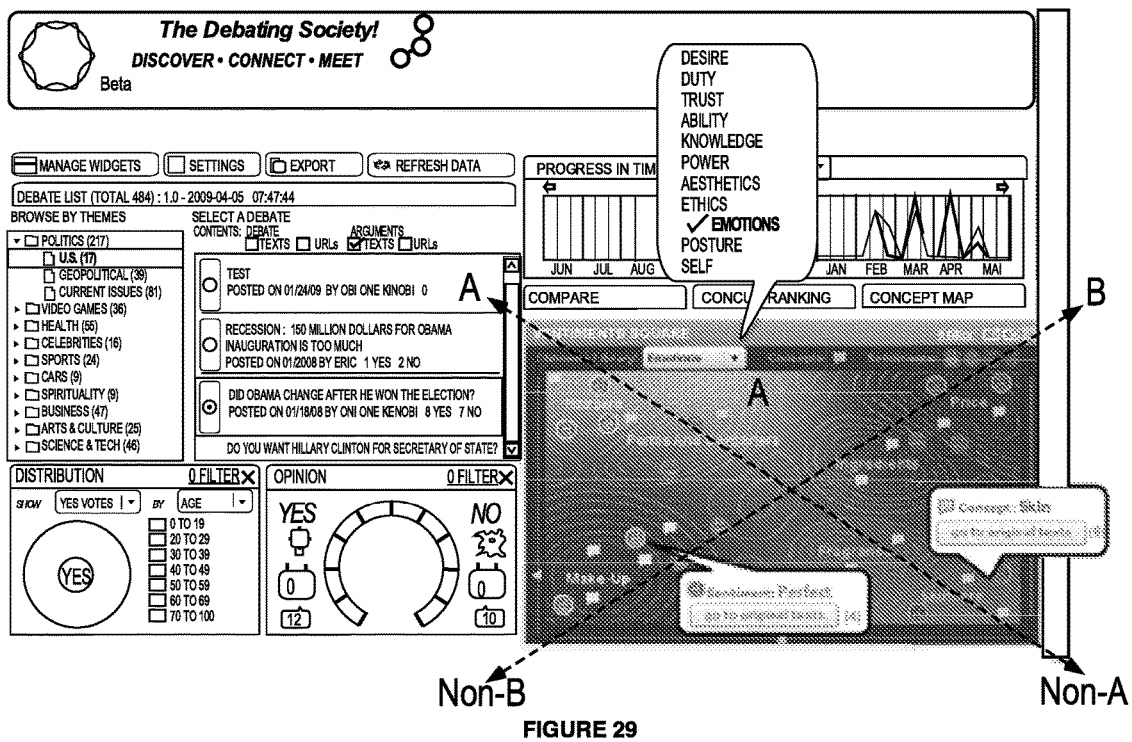
FIG. 29 illustrates another example of a sentiment analytics using the semiotic system.

The example of FIG. 29 shows that a square graphical representation can be used to represent the four semiotic positions defined in FIG. 3: A (Fact), Non-A (Rebuttal), B (Denial), and Non-B (Excess). The categories ("Hair care", "Skincare", "Price", "Make-up") are positioned on the four summits of the square according to their semiotic values (green=positive and red=negative, shades of green and red express intensity).

While the foregoing has been with reference to a particular embodiment of the invention, it will be appreciated by those skilled in the art that changes in this embodiment may be made without departing from the principles and spirit of the invention, the scope of which is defined by the appended claims.

The invention claimed is:

1. A semiotic square analysis system, comprising:
a storage device storing a plurality of semiotic squares, each semiotic square further comprising a fact, a rebuttal of the fact, a denial of the fact and an excess wherein each semiotic square defines a sentiment;
a semiotic square generator on a computer system that generates the plurality of semiotic squares stored in the storage device from a corpus of data, wherein the semiotic square generator determines a positive fact that is a combination of an auxiliary and a property, generates a non-positive fact by removing the property from the positive fact, generates a negative fact that is a combination of a negative auxiliary and the property and generates a more negative fact that is a combination of a more negative auxiliary and the property; and
the computer system having a processor and the processor is configured to utilize the plurality of semiotic squares to analyze a request for sentiment based on the corpus of data and generate sentiment analysis results.

2. The system of claim 1, wherein each semiotic square is stored in a thesaurus data structure.

3. The system of claim 1, wherein each semiotic square is indexed.

4. The system of claim 1, wherein the corpus of data further comprises one or more of a document, a blog, a text string, a post and a video.

5. The system of claim 1 further comprising one or more computing devices that are capable of being coupled to the computer system over a link, wherein each computing device generates a search request and communicates the search request to the computer system.

6. The system of claim 5, wherein each computing device further comprises one of a personal computer, a laptop computer, a mobile phone and a smart phone.

7. The system of claim 5, wherein the link further comprises one of a wired link and a wireless link.

8. The system of claim 1, wherein the computer system further comprises one or more server computers.

9. A method, the method comprising:
providing a plurality of semiotic squares stored in a storage device each semiotic square further comprising a fact, a rebuttal of the fact, a denial of the fact and an excess wherein each semiotic square defines a sentiment;
generating the plurality of semiotic squares from a corpus of data;
determining a positive fact that is a combination of an auxiliary and a property;
generating a non-positive fact by removing the property from the positive fact;
generating a negative fact that is a combination of a negative auxiliary and the property;
generating a more negative fact that is a combination of a more negative auxiliary and the property; and
utilizing, on a computer system having a processor, the plurality of semiotic squares to analyze a request for sentiment based on the corpus of data and generate sentiment analysis results.

* * * * *